United States Patent
Kumar et al.

(10) Patent No.: US 12,465,320 B1
(45) Date of Patent: Nov. 11, 2025

(54) WEARABLE DEVICE FOR NON-INVASIVE MONITORING OF INTRACRANIAL PRESSURE THROUGH OPHTHALMIC BIOMARKERS

(71) Applicant: Novateur Research Solutions, Ashburn, VA (US)

(72) Inventors: Viksit Kumar, Ashburn, VA (US); Khurram Hassan-Shafique, Aldie, VA (US); Zeeshan Rasheed, Great Falls, VA (US)

(73) Assignee: Novateur Research Solutions, Ashburn, VA (US)

( * ) Notice: Subject to any disclaimer, the term of this patent is extended or adjusted under 35 U.S.C. 154(b) by 0 days.

(21) Appl. No.: 19/184,843

(22) Filed: Apr. 21, 2025

(51) Int. Cl.
| | |
|---|---|
| *A61B 8/08* | (2006.01) |
| *A61B 8/00* | (2006.01) |
| *A61B 8/10* | (2006.01) |
| *G06T 7/00* | (2017.01) |
| *G06T 7/62* | (2017.01) |
| *G16H 10/60* | (2018.01) |

(52) U.S. Cl.
CPC .................. *A61B 8/08* (2013.01); *A61B 8/10* (2013.01); *A61B 8/4227* (2013.01); *A61B 8/4281* (2013.01); *A61B 8/4461* (2013.01); *A61B 8/463* (2013.01); *A61B 8/54* (2013.01); *A61B 8/56* (2013.01); *G06T 7/0012* (2013.01); *G06T 7/62* (2017.01); *G16H 10/60* (2018.01); *G06T 2207/10132* (2013.01); *G06T 2207/20081* (2013.01); *G06T 2207/30041* (2013.01); *G06T 2207/30168* (2013.01)

(58) Field of Classification Search
CPC ........... A61B 8/08; A61B 8/10; A61B 8/4227; A61B 8/4281; A61B 8/4461; A61B 8/463; A61B 8/54; A61B 8/56; G06T 7/0012; G06T 7/62; G06T 2207/10132; G06T 2207/20081; G06T 2207/30041; G06T 2207/30168; G16H 10/60
See application file for complete search history.

(56) References Cited

U.S. PATENT DOCUMENTS

| | | | |
|---|---|---|---|
| 2011/0137182 A1* | 6/2011 | Bellezza | A61B 5/4029 600/485 |
| 2018/0132739 A1* | 5/2018 | Brekken | A61B 8/485 |
| 2020/0077906 A1* | 3/2020 | Lyon | A61B 5/0205 |
| 2020/0367774 A1* | 11/2020 | Hong | A61B 8/4209 |

* cited by examiner

*Primary Examiner* — Amelie R Davis
(74) *Attorney, Agent, or Firm* — Rahman LLC

(57) ABSTRACT

A wearable device for non-invasive monitoring of intracranial pressure includes a wearable structure configured to be secured to a head of a user; an ultrasound transducer positioned to align with an eye of the user when worn; a motorized control mechanism that dynamically adjusts a position and angulation of the ultrasound transducer; a fluid management system that maintains an acoustic coupling between the ultrasound transducer and the eye of the user; an integrated air vent system to regulate pressure, prevent condensation, and maintain imaging quality within the wearable structure; and a processor coupled to the ultrasound transducer. The processor is to employ a reinforcement learning-based control system for optimizing transducer placement; acquire ultrasound images of an optic nerve sheath; analyze the ultrasound images to measure an optic nerve sheath diameter (ONSD); and determine a likelihood of elevated intracranial pressure based on the measured ONSD.

20 Claims, 17 Drawing Sheets

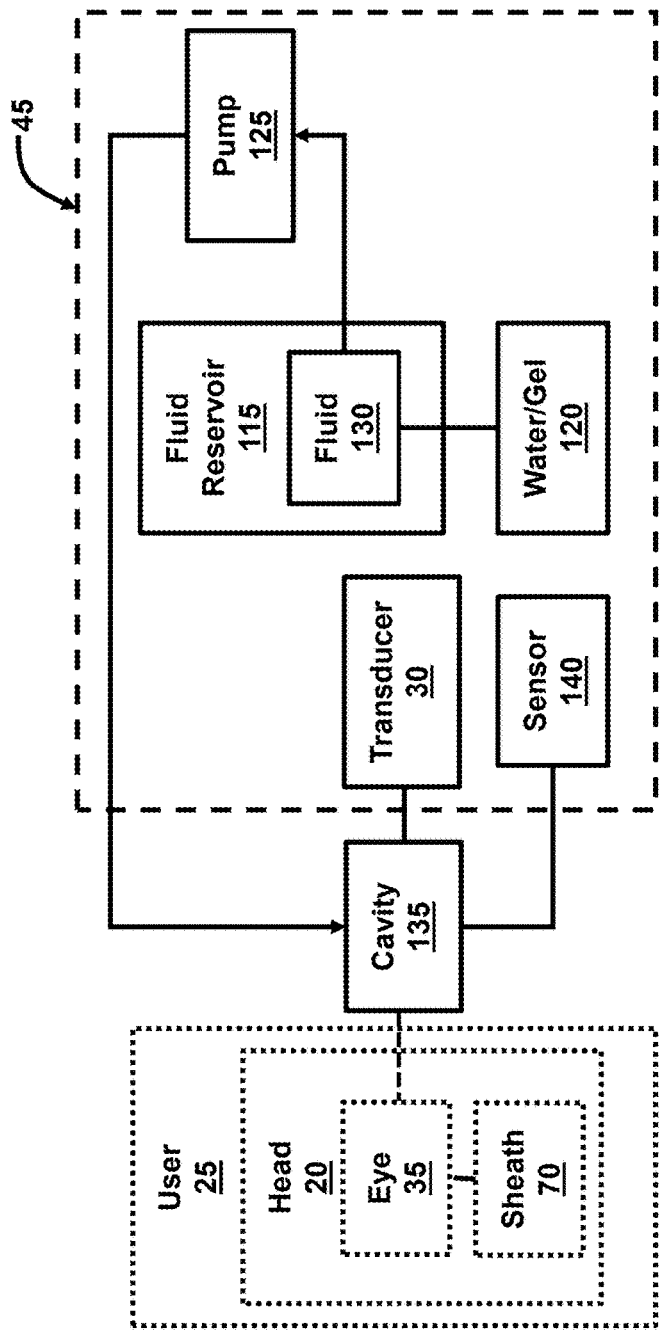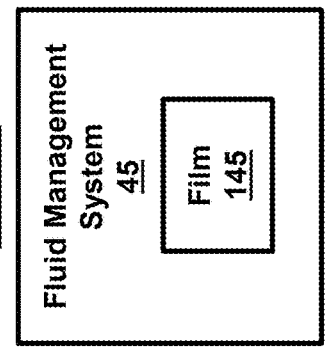

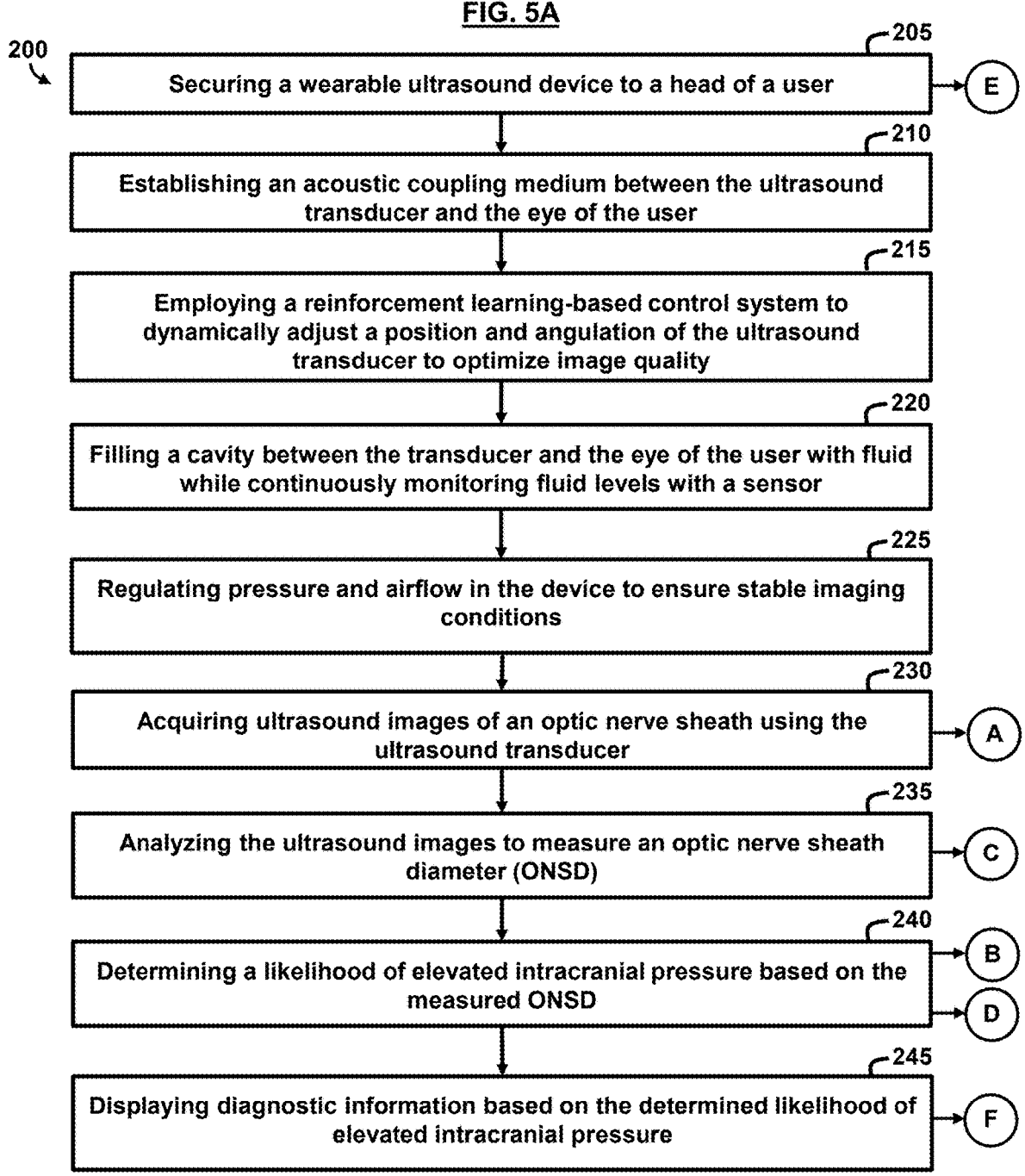

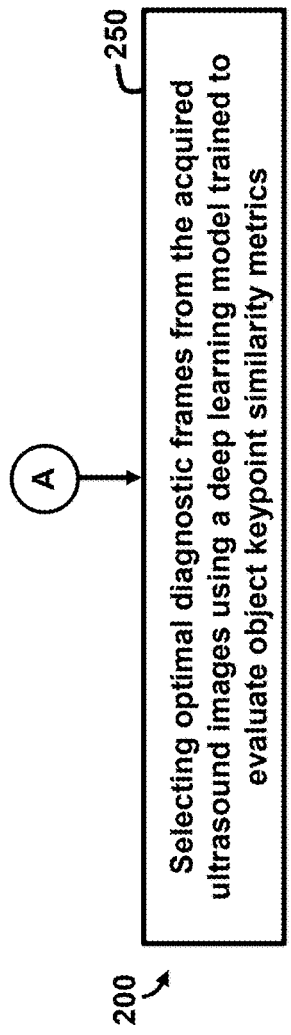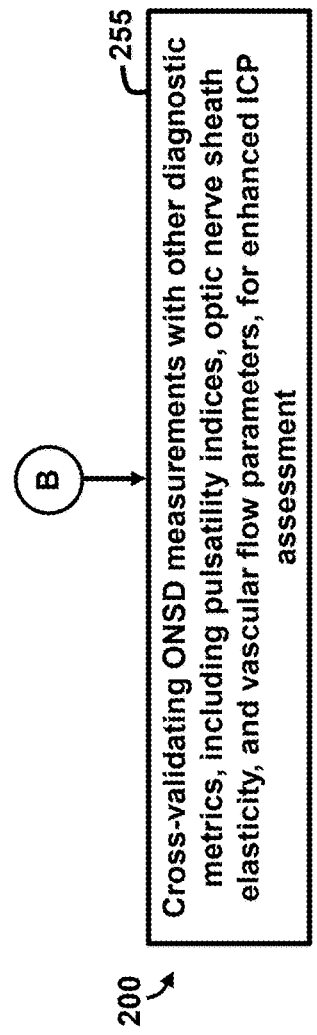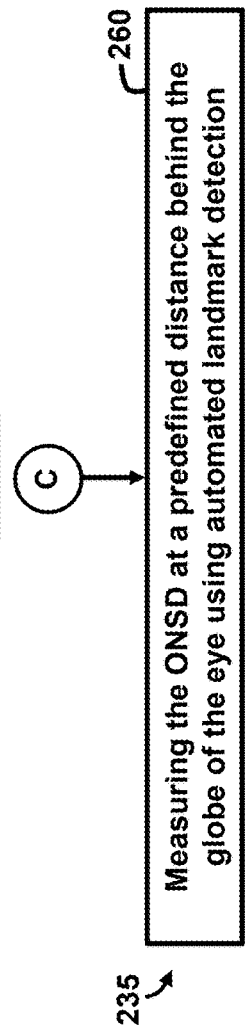

FIG. 5E

200 → D → 265: Personalizing threshold values for ONSD measurements based on demographic factors specific to the user to improve diagnostic accuracy

FIG. 5F

200 → E → 270: Operating the wearable ultrasound device in either continuous monitoring mode for real-time ICP tracking or intermittent monitoring mode for periodic assessment

FIG. 5G

200 → F → 275: Archiving acquisition parameters, diagnostic data, and metadata for integration with electronic health records
→ 280: Wirelessly transmitting the diagnostic information to a remote monitoring system

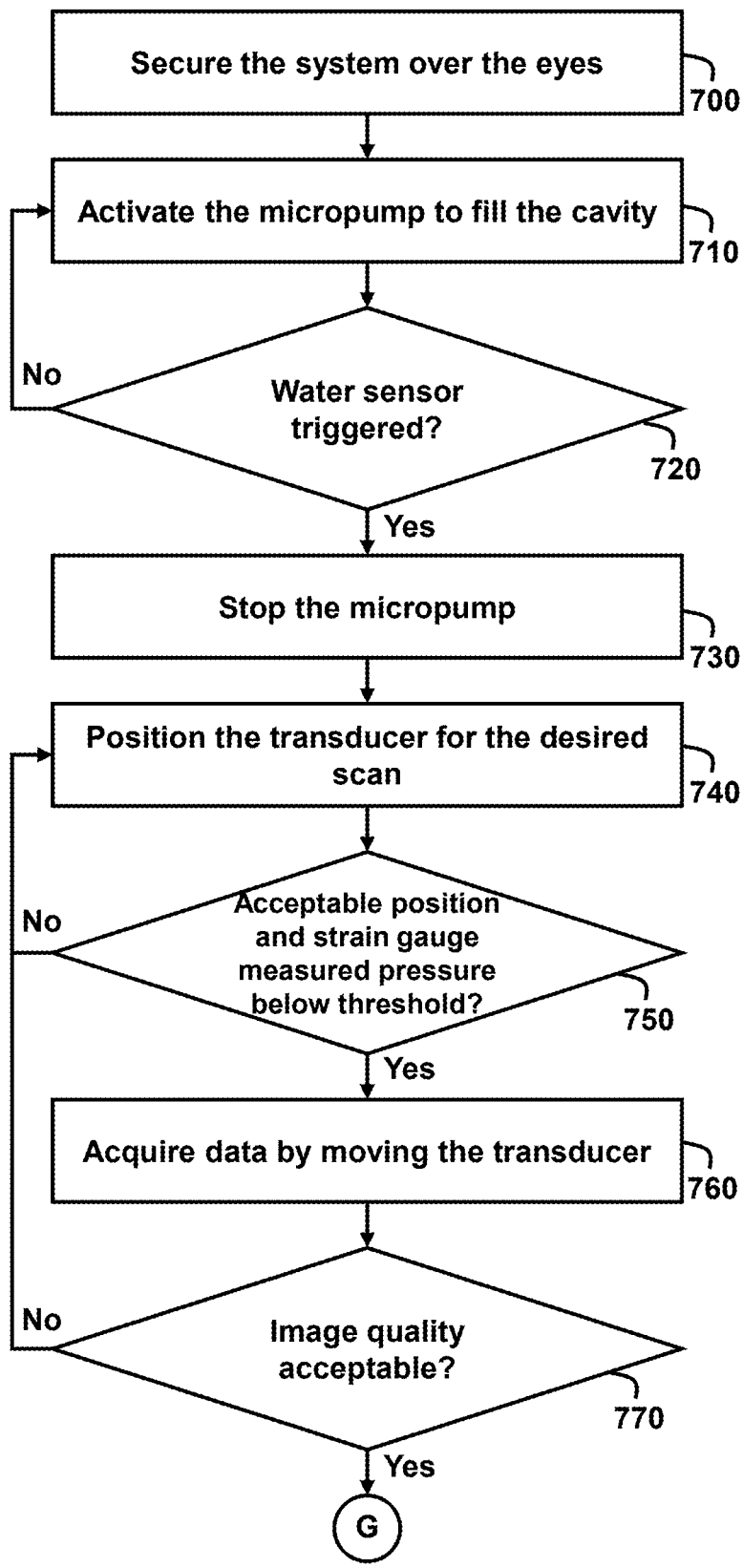

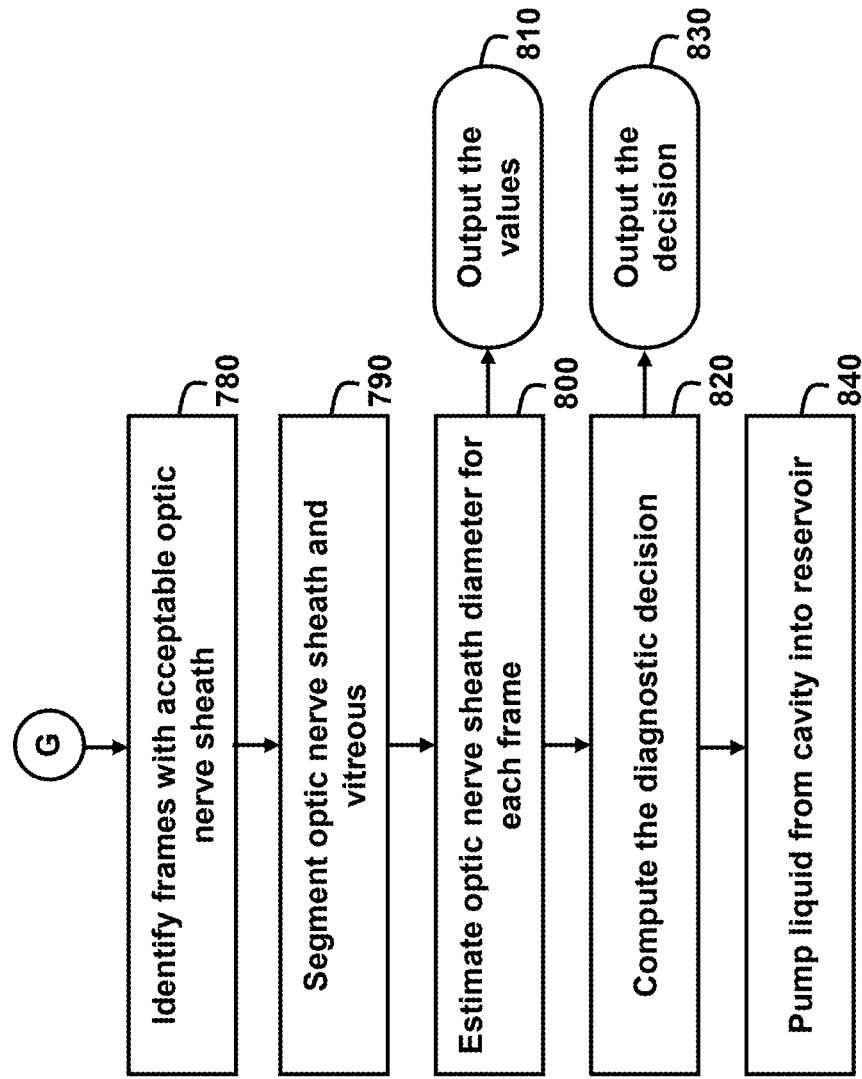

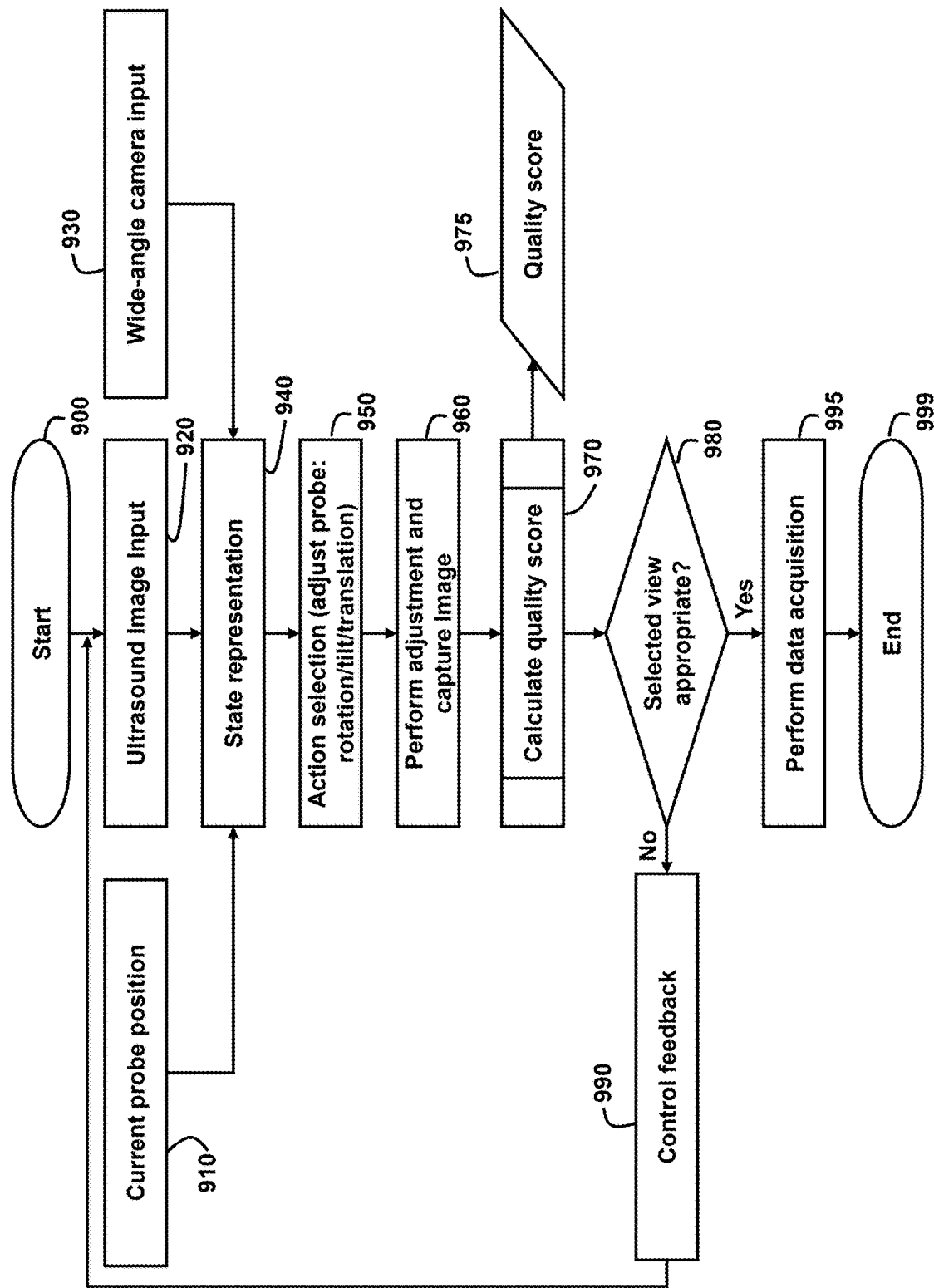

WEARABLE DEVICE FOR NON-INVASIVE MONITORING OF INTRACRANIAL PRESSURE THROUGH OPHTHALMIC BIOMARKERS

BACKGROUND

Technical Field

The embodiments herein generally relate to medical diagnostic devices, and more particularly to wearable ultrasonic imaging systems for non-invasive monitoring of intracranial pressure through ophthalmic biomarkers.

Description of the Related Art

This background description includes information that may be useful in understanding the present invention. It is not an admission that any of the information provided herein is prior art or relevant to the presently claimed invention or that any publication specifically or implicitly referenced is prior art.

Intracranial pressure (ICP) monitoring is critical in managing traumatic brain injuries, strokes, intracranial hemorrhages, hydrocephalus, meningitis, and other neurological conditions that can elevate pressure within the cranial vault. Elevated ICP, if left undetected and untreated, can lead to reduced cerebral perfusion, brain herniation, secondary brain injury, and death. The preferred conventional approaches for ICP measurement traditionally involves invasive techniques such as intraventricular catheterization or intraparenchymal monitoring, which provide direct and continuous pressure measurements. However, these invasive methods carry significant risks including infection, hemorrhage, and mechanical tissue damage, with reported complication rates of 1-7% for infections and 1-2% for hemorrhages. Moreover, these procedures require neurosurgical expertise, specialized equipment, and sterile operating conditions, rendering them impractical in emergency settings, austere environments, or resource-limited facilities.

Non-invasive approaches for estimating ICP have emerged as alternatives to invasive monitoring. These include imaging modalities such as computed tomography (CT), magnetic resonance imaging (MRI), transcranial Doppler ultrasonography, and optic nerve sheath diameter (ONSD) measurement via ultrasound. Among these, ONSD measurement has gained significant attention due to its portability, cost-effectiveness, and real-time capabilities. The optic nerve sheath is anatomically continuous with the subarachnoid space surrounding the brain and contains cerebrospinal fluid (CSF). As ICP rises, CSF is forced into the optic nerve sheath, causing it to expand. This expansion can be visualized and measured using ultrasound, providing a surrogate marker for elevated ICP.

Despite its potential, conventional ultrasound-based ONSD measurement faces several limitations. Current practices typically involve handheld ultrasound probes operated by trained sonographers or clinicians. This approach introduces significant operator dependency, resulting in measurement variability due to inconsistent probe positioning, angle, and pressure application. Studies have reported inter-observer variability ranging from 0.2 to 0.6 mm in ONSD measurements, which is clinically significant considering that the diagnostic threshold for elevated ICP is approximately 5.0-5.9 mm. Furthermore, traditional ultrasound systems are designed for intermittent assessments rather than continuous monitoring, limiting their ability to detect dynamic changes in ICP that may occur rapidly in critical conditions.

Existing portable ultrasound systems for ONSD measurement require manual operation and substantial expertise to ensure reliable results. The operator must maintain precise probe positioning over extended periods, which is physically demanding and prone to error, especially in dynamic environments such as during patient transport or in field settings. Additionally, these systems lack automated image optimization, quality control, and diagnostic interpretation capabilities, further contributing to measurement inconsistencies and diagnostic challenges, particularly for less experienced operators.

Several attempts have been made to develop wearable devices for ICP monitoring. For example, WO2023196190A1 describes a wearable device with flexible transducer arrays attached to the exterior of the patient's eyelid, and WO2019132469A1 proposes a goggle-based system using B-mode ultrasound to measure ONSD. However, these systems employ static imaging frameworks without dynamic adjustment capabilities and have limited functionality in austere or resource-constrained environments. They also do not address the fundamental challenges of operator dependency, image quality variability, and continuous monitoring capabilities that are essential for effective ICP management.

The limitations of current ICP monitoring technologies underscore the need for a solution that can accommodate anatomical variations, provide real-time feedback, reduce operator dependency, enhance portability, and ensure cost-effectiveness. Such a system would be particularly valuable in urgent care, military operations, austere environments, and patient transportation settings, where traditional ICP monitoring methods are impractical or unfeasible.

SUMMARY

In view of the foregoing, an embodiment herein provides a wearable device for non-invasive monitoring of intracranial pressure (ICP), comprising a wearable structure configured to be secured to a head of a user; at least one ultrasound transducer integrated within the wearable structure and positioned to align with an eye of the user when worn; a motorized control mechanism with six degrees of freedom that dynamically adjusts a position and angulation of the at least one ultrasound transducer; a fluid management system that maintains an acoustic coupling between the at least one ultrasound transducer and the eye of the user; an integrated air vent system to regulate pressure, prevent condensation, and maintain imaging quality within the wearable structure; and a processor coupled to the ultrasound transducer, wherein the processor is to: employ a reinforcement learning-based control system for optimizing transducer placement; acquire ultrasound images of an optic nerve sheath; analyze the ultrasound images to measure an optic nerve sheath diameter (ONSD); and determine a likelihood of elevated intracranial pressure based on the measured ONSD. The wearable device further comprises a hinged lens mechanism that allows selective opening and closing for temporary vision access without removing the device from the user; a wide-angle camera that provides real-time anatomical visualization to assist in transducer positioning; and a graphical user interface that displays diagnostic information based on the determined likelihood of elevated intracranial pressure.

The wearable device may comprise an audio speaker that provides instructions to the user based on the diagnostic information. The wearable structure may comprise at least one lens positioned to cover the eye of the user. The ultrasound transducer may be integrated within the at least one lens and scans superior to inferior aspects and midline to lateral aspects of the eye. The processor may implement an artificial intelligence algorithm to dynamically adjust imaging parameters, including gain, depth, frequency, and focus, based on anatomical characteristics specific to the user. The fluid management system may comprise a fluid reservoir containing water or ultrasound gel; a pump that transfers fluid from the fluid reservoir to a cavity formed between the ultrasound transducer and the eye of the user; and a fluid level sensor that monitors an amount of fluid in the cavity. Alternatively, the fluid management system may comprise a film containing a hydrogel.

The processor may use deep learning-based object keypoint similarity (OKS) to identify optimal diagnostic frames and measure the ONSD at a predefined depth behind the globe of the eye. The wearable device may comprise a power management module that selectively activates components of the wearable device based on operational requirements and a rechargeable power supply configured to support operation in remote environments. The graphical user interface may provide customizable diagnostic views, including trend graphs, confidence scores, and real-time alerts. The device may operate in dual operational modes supporting continuous and intermittent monitoring.

Another embodiment provides a method for non-invasive monitoring of ICP, the method comprising securing a wearable ultrasound device to a head of a user, the wearable ultrasound device comprising at least one ultrasound transducer positioned to align with an eye of the user; establishing an acoustic coupling medium between the ultrasound transducer and the eye of the user; employing a reinforcement learning-based control system to dynamically adjust a position and angulation of the ultrasound transducer to optimize image quality; filling a cavity between the transducer and the eye of the user with fluid while continuously monitoring fluid levels with a sensor; regulating pressure and airflow in the device to ensure stable imaging conditions; acquiring ultrasound images of an optic nerve sheath using the ultrasound transducer; analyzing the ultrasound images to measure an optic nerve sheath diameter (ONSD); determining a likelihood of elevated intracranial pressure based on the measured ONSD; and displaying diagnostic information based on the determined likelihood of elevated intracranial pressure.

The method may comprise selecting optimal diagnostic frames from the acquired ultrasound images using a deep learning model trained to evaluate object keypoint similarity metrics. The method may comprise cross-validating ONSD measurements with other diagnostic metrics, including pulsatility indices, optic nerve sheath elasticity, and vascular flow parameters, for enhanced ICP assessment. Analyzing the ultrasound images may comprise measuring the ONSD at a predefined distance behind the globe of the eye using automated landmark detection. The method may comprise personalizing threshold values for ONSD measurements based on demographic factors specific to the user to improve diagnostic accuracy. The method may comprise operating the wearable ultrasound device in either continuous monitoring mode for real-time ICP tracking or intermittent monitoring mode for periodic assessment. The method may comprise archiving acquisition parameters, diagnostic data, and metadata for integration with electronic health records; and wirelessly transmitting the diagnostic information to a remote monitoring system.

Another embodiment provides a non-transitory computer-readable medium storing instructions that, when executed by a processor of a wearable ultrasound device, cause the processor to perform a method for non-invasive intracranial pressure monitoring, the method comprising the method comprising performing the computer-executable instructions comprising controlling an ultrasound transducer positioned adjacent to an eye of a user to acquire ultrasound images of an optic nerve sheath; implementing a reinforcement learning algorithm to optimize transducer placement and ensure the optic nerve sheath is within an imaging field-of-view; analyzing the ultrasound images for quality control, including automatically filtering low-quality frames; controlling a motorized control mechanism with six degrees of freedom to dynamically adjust a position of the ultrasound transducer based on image quality feedback; measuring an optic nerve sheath diameter (ONSD) from selected ultrasound images; determining a likelihood of elevated intracranial pressure based on the measured ONSD; and generating output data including a quality score, diagnostic measurements, confidence scores, and alerts.

Implementing the reinforcement learning algorithm may comprise filtering ultrasound images that fail to meet predetermined quality thresholds related to anatomical landmark visibility of the optic nerve sheath. The computer-executable instructions may comprise tracking temporal changes in ONSD measurements over time to detect trends indicative of changing intracranial pressure. The computer-executable instructions may comprise cross-validating ONSD measurements with supplementary diagnostic parameters including pulsatility indices and vascular flow metrics to enhance diagnostic reliability. The computer-executable instructions may comprise automatically switching between continuous and intermittent monitoring modes based on detected changes in ONSD measurements that exceed predefined variability thresholds.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is a block diagram illustrating the fluid management system of the wearable device of FIG. 1, according to an embodiment herein;

FIG. 3B is a block diagram illustrating another fluid management system of the wearable device of FIG. 1, according to an embodiment herein;

FIG. 5A is a flow diagram illustrating a method for non-invasive monitoring of ICP, according to an embodiment herein;

FIG. 5B is a flow diagram illustrating a method for selecting optimal diagnostic frames from acquired ultrasound images using a deep learning model trained to evaluate object keypoint similarity metrics, according to an embodiment herein;

FIG. 5C is a flow diagram illustrating a method for cross-validating ONSD measurements with other diagnostic metrics, including pulsatility indices, optic nerve sheath elasticity, and vascular flow parameters, for enhanced ICP assessment, according to an embodiment herein;

FIG. 5D is a flow diagram illustrating a method for measuring the ONSD at a predefined distance behind the globe of the eye using automated landmark detection, according to an embodiment herein;

FIG. 5E is a flow diagram illustrating a method for personalizing threshold values for ONSD measurements based on demographic factors specific to the user to improve diagnostic accuracy, according to an embodiment herein;

FIG. 5F is a flow diagram illustrating a method for operating the wearable ultrasound device in either continuous monitoring mode for real-time ICP tracking or intermittent monitoring mode for periodic assessment, according to an embodiment herein;

FIG. 5G is a flow diagram illustrating a method for archiving acquisition parameters, diagnostic data, and metadata for integration with electronic health records and wirelessly transmitting the diagnostic information to a remote monitoring system, according to an embodiment herein;

FIG. 10 is a flow diagram illustrating the operational workflow for the wearable device for non-invasive monitoring of intracranial pressure, according to an embodiment herein;

FIG. 11 is a flow diagram illustrating the reinforcement learning-based control system for optimizing ultrasound transducer placement in the wearable device, according to an embodiment herein;

Figure 1:
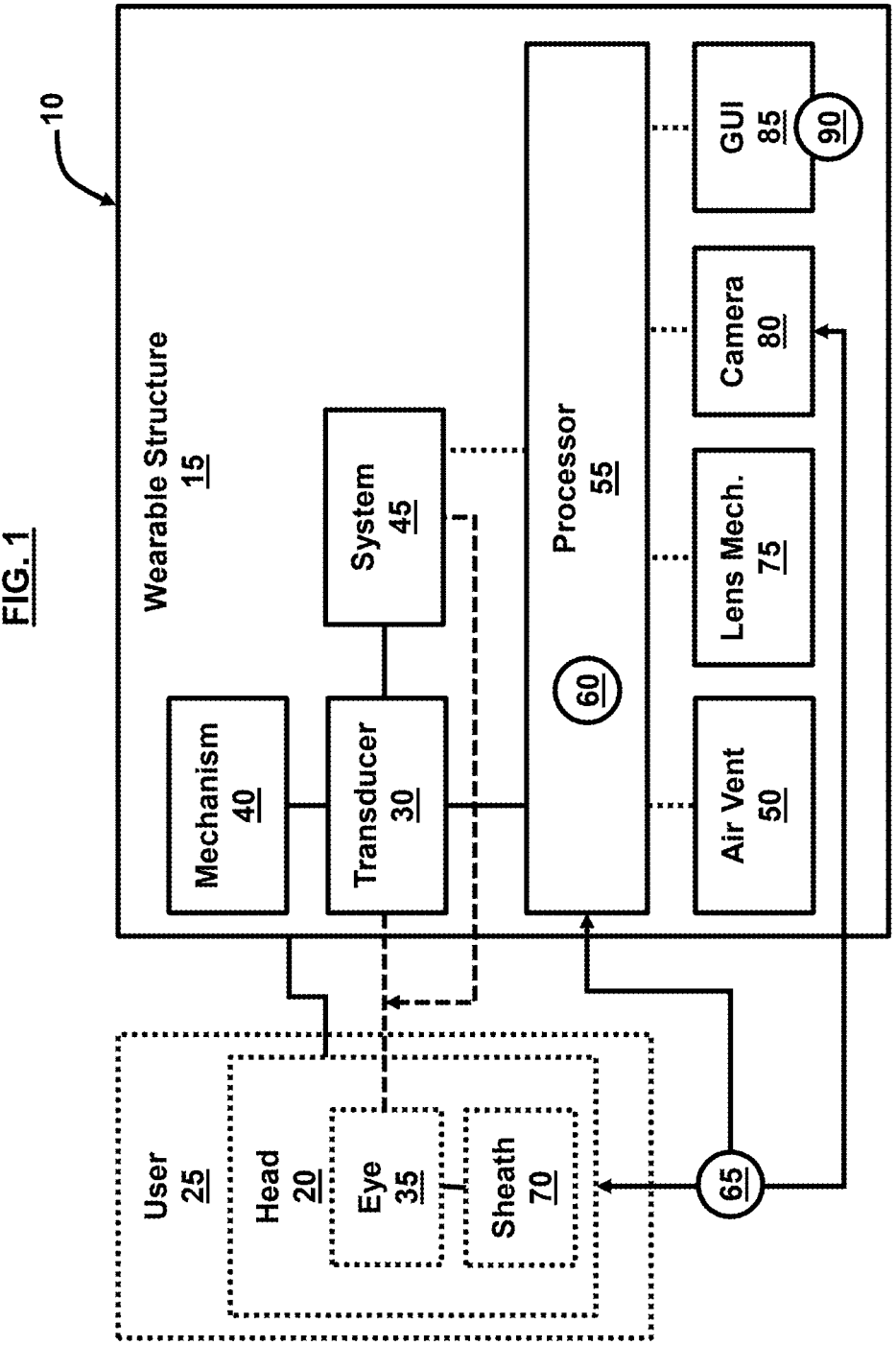
FIG. 1 is a block diagram illustrating a wearable device for non-invasive monitoring of ICP, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Furthermore, although the terms "final", "first", "second", "upper", "lower", "bottom", "side", "intermediate", "middle", and "top", etc. may be used herein to describe various elements, but these elements should not be limited by these terms. These terms are only used to distinguish one element from another. For example, a first element could be termed a "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments described herein provide a wearable device and implementing a system and method for non-invasive monitoring of intracranial pressure through ophthalmic biomarkers. The embodiments herein integrate advanced ultrasound imaging technology with artificial intelligence to automate the measurement of optic nerve sheath diameter (ONSD) as a surrogate marker for intracranial pressure. This innovative approach addresses critical limitations in current ICP monitoring technologies by accommodating anatomical variations, providing real-time feedback, reducing operator dependency, enhancing portability, and ensuring cost-effectiveness across diverse clinical environments including austere settings. Referring now to the drawings, and more particularly to FIGS. 1 through 13, where similar reference characters denote corresponding features consistently throughout the figures, there are shown preferred embodiments. In the drawings, the size and relative sizes of components, layers, and regions, etc. may be exaggerated for clarity.

FIG. 1 illustrates a wearable device 10 for non-invasive monitoring of ICP, comprising a wearable structure 15 configured to be secured to a head 20 of a user 25; at least one ultrasound transducer 30 integrated within the wearable structure 15 and positioned to align with an eye 35 of the user 25 when worn; a motorized control mechanism 40 with six degrees of freedom that dynamically adjusts a position and angulation of the at least one ultrasound transducer 30; a fluid management system 45 that maintains an acoustic coupling between the at least one ultrasound transducer 30 and the eye 35 of the user 25; an integrated air vent system 50 to regulate pressure, prevent condensation, and maintain imaging quality within the wearable structure 15; and a processor 55 coupled to the ultrasound transducer 30. The processor 55 is to employ a reinforcement learning-based control system 60 for optimizing transducer placement; acquire ultrasound images 65 of an optic nerve sheath 70; analyze the ultrasound images 65 to measure an optic nerve sheath diameter (ONSD); and determine a likelihood of elevated intracranial pressure based on the measured ONSD. The device 10 further comprises a hinged lens mechanism 75 that allows selective opening and closing for temporary vision access without removing the device 10 from the user 25; a wide-angle camera 80 that provides real-time anatomical visualization to assist in transducer positioning; and a graphical user interface 85 that displays diagnostic information 90 based on the determined likelihood of elevated intracranial pressure.

The wearable structure 15 may be configured as a goggle-like apparatus fabricated from lightweight, medical-grade polymers. The structure 15 features an ergonomic design with contoured edges that conform to various facial anatomies, ensuring a comfortable fit across different head sizes and shapes. The material composition includes a combination of rigid polycarbonate for structural integrity and softer silicone-based elastomers at contact points with the face to provide comfort during extended wear. The structure 15 incorporates adjustable elastic straps with quick-release mechanisms that distribute pressure evenly around the head 20 of the user 25 while allowing for rapid donning and doffing in emergency situations. The interior surface of the wearable structure 15 may be lined with hypoallergenic, moisture-wicking material to prevent skin irritation during prolonged use. Antimicrobial coatings are applied to all patient-contact surfaces to maintain hygiene standards across multiple uses. The entire structure 15 weighs approximately 180-220 grams, making it light enough for extended wear while maintaining sufficient stability to resist movement during patient transportation or position changes. The frame includes reinforced mounting points for the ultrasound transducer 30, motorized control mechanisms 40, and associated electronics, designed to withstand forces encountered in austere environments while preserving precise alignment of all components.

While the wearable structure 15 may primarily be configured as a goggle-like apparatus, alternative embodiments may employ different form factors to accommodate various operational scenarios. A headband-mounted configuration could be particularly useful in emergency and field settings where rapid deployment is required without obstructing vision. A helmet-based integration could be adapted for use in combat environments, aviation, and space missions, where continuous ICP monitoring must coexist with protective headgear. An eye mask variation could be optimized for sleep studies or extended ICU monitoring, ensuring comfortable overnight use while maintaining consistent positioning of the ultrasound transducer. Each alternative embodiment preserves the core functional elements—ultrasound transducer, motorized control mechanism, and AI processing—while adapting the mounting structure to suit specific operational requirements.

The ultrasound transducer 30 may be configured as a 1D phased array with 32-256 elements configured for ophthalmic applications. The transducer 30 operates at a center frequency of 10.0 MHz with an 8 MHz bandwidth, providing an optimal balance between resolution (approximately 0.15-0.2 mm axial resolution) and penetration depth (up to 40-50 mm). The array dimensions are carefully miniaturized to approximately 20 mm×5 mm×3 mm, enabling integration within the wearable structure 15 while maintaining a wide field of view. The transducer 30 implements piezoelectric composite technology with proprietary matching layers that optimize acoustic transmission through the eyelid and ocular structures of the eye 35 of the user 25. Multi-layer backing material with precisely calibrated acoustic impedance minimizes reverberations and unwanted artifacts. Micro-beamforming circuits may be integrated directly into the transducer 30, enabling 128-channel operation while minimizing the size of connecting cables. The transducer elements are arranged with λ/2 spacing (approximately 75 µm) to prevent grating lobes while maximizing lateral resolution. Electronic focusing capabilities allow dynamic adjustment of the focal zone from 10 mm to 30 mm, encompassing the typical depth range of the optic nerve sheath 70.

The configuration of the ultrasound transducer 30 enables multi-plane scanning capabilities that significantly enhance diagnostic accuracy. While scanning from superior to inferior aspects captures the vertical extent of the optic nerve sheath 70, the device 10 also scans from midline to lateral aspects, ensuring a comprehensive view of the entire nerve sheath structure. This dual-plane approach enhances the detection of localized swelling that might be missed in single-plane scanning, minimizes measurement variability by providing a multi-angle assessment, and improves reproducibility by incorporating multiple scanning perspectives. By capturing the optic nerve sheath 70 from these complementary angles, the system ensures the most diagnostically valuable images 65 are obtained regardless of individual anatomical variations.

The motorized control mechanism 40 may include a sophisticated mechatronic system that provides six degrees of freedom for precise transducer 30 positioning: three translational axes (x, y, z) and three rotational axes (pitch, yaw, roll). The mechanism 40 employs miniaturized high-precision brushless DC motors with integrated optical encoders that achieve positioning accuracy of ±0.1 mm and ±0.5 degrees. The translational range spans ±5 mm along each axis, while rotational adjustments can reach ±15 degrees, sufficient to accommodate anatomical variations across different patient demographics. A custom-designed multi-linkage mechanical assembly transfers motor movements to the transducer 30 while minimizing backlash and mechanical hysteresis. The mechanism 40 incorporates micro-limit switches and torque sensing to prevent excessive pressure on the eye 35 during positioning adjustments. All moving components are encased in a sealed housing to prevent contamination and ensure reliable operation in diverse environments. The motors are driven by dedicated microcontrollers with closed-loop control algorithms that implement motion smoothing and vibration damping, ensuring user 25 comfort during adjustments. Power consumption is optimized through selective activation of motors and variable holding torque settings based on required positioning stability. The entire mechanism 40 weighs less than 45 grams and operates with noise levels below 35 dBA to minimize patient discomfort and distraction.

The fluid management system 45 utilizes a comprehensive approach to maintain optimal acoustic coupling between the transducer 30 and the eye 35. As indicated in FIG. 3A, the system 45 features a medical-grade fluid reservoir 115 with 10-15 ml capacity, containing specially formulated ultrasound gel 120 with controlled viscosity (5000-8000 centipoise) and acoustic impedance (approximately 1.63 MRayl) that closely matches ocular tissue properties. A precision piezoelectric micropump 125 capable of delivering fluid volumes as small as 0.1 ml per activation operates at adjustable flow rates between 0.5-2 ml/minute. The pump 125 is bidirectional, allowing both dispensing and retrieval of coupling fluid 130. Distribution channels embedded within the wearable structure 15 direct the coupling medium to the cavity 135 between the transducer 30 and closed eyelid of the eye 35 while preventing leakage. A non-contact capacitive fluid level sensor 140 continuously monitors the coupling medium volume, triggering automatic replenishment when levels fall below 0.3 ml. Alternatively, the system 45 can employ a specialized hydrogel film 145 (shown in FIG. 3B) containing 90% water content with acoustic enhancement particles, eliminating the need for liquid management while maintaining acoustic performance for up to 6-8 hours. The entire system 45 is controlled by a dedicated processor 55 that adjusts fluid delivery based on real-time impedance measurements from the ultrasound transducer 30, ensuring consistent coupling quality.

Again with reference to FIG. 1, the integrated air vent system 50 comprises a network of selectively placed microvents with selective permeability membranes that allow air passage while blocking liquid transmission. The primary vent locations are positioned at the superior and lateral aspects of the wearable structure 15, creating a controlled airflow path that facilitates pressure equalization without compromising the seal around the eyes 35. Each vent incorporates a one-way valve mechanism that prevents fluid egress while allowing the release of trapped air and excess pressure. In an example, the membrane material is a hydrophobic expanded polytetrafluoroethylene (ePTFE) with 0.2-micron pore size, providing bacterial filtration efficiency exceeding 99.9% while maintaining airflow rates of 50-100 ml/minute at 5 mm $H_2O$ pressure differential. Anti-fogging channels direct airflow across the interior lens surfaces to prevent condensation formation that could obstruct visualization. The system 50 incorporates passive pressure sensors that monitor the differential pressure between the interior of the wearable structure 15 and ambient environment, triggering alerts if values exceed predefined safety thresholds (typically ±15 mm $H_2O$). This pressure regulation is critical during altitude changes in aeromedical evacuation scenarios or when transitioning between pressure-controlled environments. The vent system 50 maintains a slight negative pressure within the cavity 135 (of FIG. 3A) to prevent fluid leakage while ensuring patient comfort during extended monitoring sessions.

In some examples, the processor 55 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a RF switch, antenna tuner, comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the system 10 and associated components. In some examples, the processor 55 may comprise a central processing unit (CPU) of the device 10. In other examples the processor 55 may be a discrete component independent of other processing components in the device 10. In other examples, the processor 55 may be a semiconductor-based microprocessor, microcontroller, field-programmable gate array (FPGA), hardware engine, hardware pipeline, and/or other hardware-enabled device suitable for receiving, processing, operating, and performing various functions for the device 10. The processor 55 may be provided in the device 10, coupled to the device 10, or communicatively linked to the device 10 from a remote networked location, according to various examples.

Furthermore, in some examples, the device 10 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

The reinforcement learning-based control system 60 employs a deep Q-network architecture that dynamically optimizes transducer 30 positioning to maximize image quality and diagnostic accuracy. The system 60 operates within a continuous state-action space defined by current transducer 30 position, orientation parameters, real-time image quality metrics, and anatomical landmark detection confidence scores. The neural network model incorporates both convolutional layers for image processing and fully connected layers for position control, with approximately 2.5 million trainable parameters optimized for embedded execution.

Furthermore, the reinforcement learning model employs a reward function that evaluates multiple imaging parameters to optimize transducer positioning. This function assigns higher rewards for frames where the optic nerve sheath 70 is centrally located within the imaging field, properly aligned perpendicular to the measurement axis, and free from artifacts or shadowing. Lower rewards are assigned when the optic nerve sheath 70 is partially visible, misaligned, or contains artifacts that could compromise measurement accuracy. The model continuously balances exploration of different probe orientations against exploitation of known optimal positions, allowing it to adapt to varying anatomical structures while learning the optimal positioning strategy for each individual patient. This approach ensures that even in dynamic environments, such as during patient transport, the system maintains a clear and stable view of the optic nerve sheath 70.

The reward function integrates multiple components: image quality (contrast ratio, signal-to-noise ratio, edge definition), anatomical landmark visibility (clarity of optic nerve sheath 70 boundaries), and measurement plane alignment (perpendicularity to the optic nerve axis). Training data may be collected from hundreds or thousands of different clinical cases, encompassing diverse patient demographics and anatomical variations. The system 60 continues to refine its positioning strategies during operation through periodic policy updates, enabling adaptation to individual patient characteristics and environmental conditions without requiring explicit reprogramming.

The ultrasound images 65 are high-resolution B-mode representations of ocular anatomy captured at frame rates of 15-30 Hz with 8-bit grayscale depth (256 intensity levels). Each image 65 undergoes real-time processing including speckle reduction filtering, edge enhancement, and contrast optimization specifically tuned for ophthalmic applications. The device 10 captures images 65 in both single-frame and cine-loop formats (3-5 second sequences) to facilitate evaluation of dynamic characteristics. The imaging parameters include a field of view spanning approximately 24 mm×30 mm with a depth setting of 30-40 mm, sufficient to visualize the entire globe and retrobulbar structures including the optic nerve sheath 70. The optic nerve sheath 70 appears in the images 65 as a hypoechoic (dark) linear structure extending posteriorly from the globe, surrounded by hyperechoic (bright) boundaries representing the dural sheath. These boundaries are typically visible to depths of 15-20 mm posterior to the globe, allowing multiple measurement points for ONSD assessment. The imaging resolution achieves approximately 0.15-0.2 mm axial resolution and 0.3-0.4 mm lateral resolution at the typical depth of the optic nerve sheath 70, enabling precise diameter measurements with sub-millimeter accuracy. Advanced tissue harmonic imaging capabilities enhance boundary definition while reducing near-field artifacts from the eyelid interface. The device 10 employs persistence settings tailored to ophthalmic imaging, balancing temporal resolution with speckle reduction to optimize visualization of the boundaries of the optic nerve sheath 70.

The hinged lens mechanism 75 allows for independent or simultaneous opening of the lenses covering each eye 35. In an example, the mechanism 75 incorporates micro-hinges fabricated from medical-grade stainless steel with self-lubricating bushings that ensure smooth operation over thousands of cycles while preventing particulate generation. Each lens can be opened to angles between 0° (fully closed) and 120° (fully open), with predetermined detents at 45° and 90° positions for stable intermediate settings. The hinge tension is carefully calibrated (requiring 0.5-0.8 N·cm torque) to prevent accidental opening while allowing single-handed operation by clinical personnel. Magnetic closure mechanisms ensure secure positioning in the closed state, with closure force calibrated to approximately 0.3-0.5 N to balance security with ease of opening. The lens material may be optical-grade polycarbonate with anti-scratch and anti-fog coatings, providing clear vision when in the open position. Safety interlocks prevent ultrasound activation when the lens covering the monitored eye 35 is in the open position, ensuring user safety and preventing unintended eye 35 exposure. The mechanism 75 design accommodates peripheral vision when in the partially open position, enabling environmental awareness without compromising the device's 10 primary monitoring function.

The wide-angle camera 80 may be configured as a miniaturized digital imaging system with a 120° field of view that provides real-time visualization of the transducer 30 positioning relative to the anatomy of the user 25. The camera 80 may utilize a ⅓" CMOS sensor with 1280×960 resolution and sensitivity down to 0.1 lux, enabling operation in reduced lighting conditions typical of clinical environments. The optical assembly incorporates an ultra-wide angle lens with F/2.2 aperture and fixed focus optimized for the 5-20 cm working distance. A ring of eight low-intensity infrared LEDs surrounding the lens may provide shadowless illumination without causing patient discomfort or pupillary constriction. The camera 80 captures images at 15-30 frames per second, transmitted to the processor 55. Advanced image processing algorithms perform real-time spatial calibration, correlating camera 80 images with ultrasound transducer 30 position to create registered anatomical overlays. The processor 55 features automatic gain control and white balance adjustment to accommodate varying environmental lighting conditions.

The graphical user interface 85 may feature a high-contrast OLED display with 800×480 pixel resolution, anti-reflective coating, and 170° viewing angles to ensure visibility across diverse clinical environments. The interface 85 presents diagnostic information 90 in a hierarchical structure optimized for rapid clinical decision-making. Primary diagnostic elements include current ONSD measurements displayed with 0.1 mm precision, accompanied by color-coded threshold indicators (e.g., green: normal range, yellow: borderline, red: elevated values) calibrated to patient-specific demographic factors. Trend visualization components present ONSD values over selectable time periods (30 minutes, 1 hour, 4 hours, or 24 hours, etc.) with annotated clinical events and interventions. Measurement quality indicators display confidence scores (0-100%) for each reading, derived from image quality metrics and anatomical landmark detection certainty. System status information includes battery charge level, connectivity status, and operational mode indicators (continuous vs. intermittent monitoring). The interface 85 supports both touch-based interaction and physical control buttons for operation with gloved hands in clinical environments. Context-sensitive help functions provide implementation guidance for non-expert users. Alert notifications for critical values utilize both visual elements (flashing indicators) and audible alerts with adjustable volume settings. The interface 85 supports multiple layout configurations optimized for different clinical workflows and user preferences, including simplified views for field operations and detailed diagnostic displays for neurointensive care settings.

Figure 2:
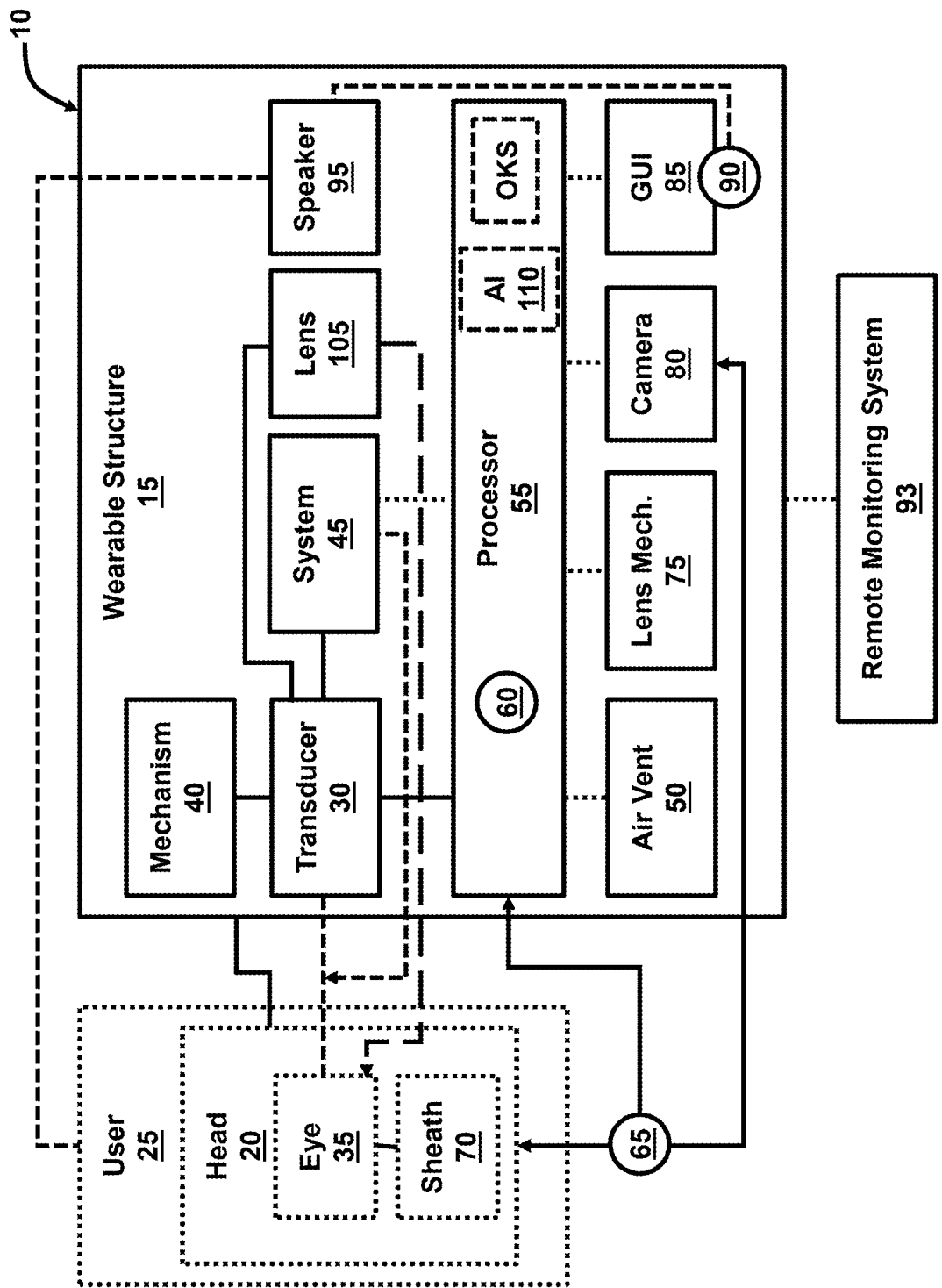
FIG. 2 is a block diagram illustrating a remote monitoring system and other aspects of the wearable device of FIG. 1, according to an embodiment herein.

FIG. 2, with reference to FIG. 1, illustrates that a remote monitoring system 93 may be wirelessly connected to the wearable device 10. The remote monitoring system 93 may comprise an advanced telemedicine platform that enables real-time transmission, visualization, and analysis of the diagnostic information 90 generated by the wearable device 10. The system 93 incorporates a multi-tier communication architecture that supports various wireless protocols including Bluetooth® Low Energy (BLE) for short-range device-to-device transmission (range up to 30 meters), Wi-Fi® (802.11a/b/g/n/ac) for hospital network integration, and optional cellular connectivity for operation in field settings without established infrastructure. All data transmission employs AES-256 encryption with mutual authentication protocols compliant with healthcare data protection regulations (HIPAA in the US, GDPR in Europe) to ensure data security while in transit.

The remote monitoring system 93 may include a distributed server architecture with local edge computing capabilities for scenarios with intermittent connectivity. This architecture includes a primary cloud-based server for data aggregation and historical storage, regional edge servers for low-latency real-time monitoring, and optional local servers for operation in connectivity-constrained environments. The system 93 implements store-and-forward capabilities that cache data locally within the wearable device 10 during connectivity interruptions, automatically synchronizing with the central database when connection is reestablished without data loss.

The remote monitoring system 93 may further provide a web-based dashboard accessible from any internet-connected device with appropriate authentication, displaying both real-time and historical monitoring data with customizable layouts optimized for different clinical roles. For clinicians, the interface presents comprehensive diagnostic visualizations including trend analysis, ONSD measurement time series with statistical annotations, and integrated alerts for values exceeding predetermined thresholds. For administrators, the system 93 provides fleet management capabilities, enabling oversight of multiple wearable devices 10 deployed across different locations, with status monitoring, remote configuration, and usage analytics.

The remote monitoring system 93 enables multi-patient monitoring from a central location, allowing a single specialist to provide oversight for numerous patients simultaneously across dispersed geographic locations. This capability is particularly valuable in mass casualty scenarios, resource-constrained environments, or for specialist consultation in remote settings. The system's 93 alert management framework allows configuration of notification thresholds and escalation pathways, with alerts deliverable via on-screen notifications, SMS, email, or integration with hospital communication systems based on urgency and user preference.

Advanced features of the remote monitoring system 93 include AI-assisted diagnostic support, which provides automated interpretation assistance for complex cases, and historical data analysis tools that facilitate research and quality improvement initiatives through anonymized aggregate data analysis. The system 93 also supports bidirectional communication, allowing remote clinicians to send guidance or instructions that can be displayed on the wearable device's 10 user interface 85 or delivered via an audio speaker 95.

Accordingly, the wearable device 10 may comprise an audio speaker 95 that provides instructions to the user 25 based on the diagnostic information 90. The audio speaker 95 may be configured as a miniaturized, high-fidelity transducer integrated into the wearable structure 15 with acoustic properties to deliver clear, intelligible audio even in noisy environments. The speaker 95 may be configured in a housing (not shown) that incorporates acoustic waveguides that direct sound toward the ear of the user 25 while minimizing sound leakage to the surrounding environment, maintaining privacy in clinical settings.

During continuous monitoring sessions, the speaker 95 can operate in a reduced-frequency mode, providing periodic status updates at configurable intervals to reassure the user 25 without causing communication fatigue. For critical alerts, the device 10 may utilize attention-getting audio patterns with increasing urgency based on the severity of the detected condition. The audio subsystem may be fully integrated with the graphical user interface 85 and processor 55, with audio confirmations synchronized with visual indicators for reinforced communication of important information.

The speaker 95 operates in conjunction with the processor 55, which analyzes the diagnostic information 90 to determine appropriate audio communications based on predefined clinical thresholds and device status conditions. This integration enables context-aware instructions that adapt to the specific clinical situation and measurement quality, such as requesting repositioning when image quality is suboptimal or providing reassurance when measurements are stable. In emergency scenarios, the speaker 95 can deliver step-by-step guidance to first responders based on detected ONSD values, supporting appropriate initial management even in the absence of specialized expertise.

Additionally, the audio speaker 95 provides specific instructions to the user 25 regarding optimal eye positioning during the examination. These instructions may include guidance to look straight ahead, slightly up, down, or to either side to optimize the imaging plane and improve ONSD visualization. For patients who are conscious but may not be familiar with the procedure, these audio prompts enhance compliance and imaging quality by ensuring proper eye positioning throughout the examination. The audio guidance is particularly valuable in field settings where non-expert operators may be conducting the assessment, providing real-time feedback that improves procedural success rates.

As mentioned, the wearable structure 15 may be configured as wearable googles. The wearable structure 15 may comprise at least one lens 105 positioned to cover the eye 35 of the user 25. The lens 105 may be constructed from optical-grade polycarbonate with a thickness of 2.0-3.0 mm, providing both optical clarity and structural integrity. The lens 105 may feature a multi-layered coating system comprising an exterior scratch-resistant layer (hardness rating 9H on the pencil hardness scale), an intermediate anti-reflective coating that reduces light reflection to less than 0.5% across the visible spectrum, and an interior anti-fog coating based on hydrophilic polymer technology that prevents condensation formation even during prolonged wear. The lens 105 geometry incorporates a subtle curvature (base curve of 8-10) that follows the natural contour of the facial anatomy while maintaining optical neutrality to prevent distortion when the user 25 views through the lens 105 during periods of temporary vision access. The lens 105 is dimensioned and configured to provide complete coverage of the orbital region with dimensions of approximately 50 mm×40 mm, sized to accommodate the 95th percentile of adult facial anatomies while maintaining a low profile.

The ultrasound transducer 30 is integrated within the at least one lens 105 and scans superior to inferior aspects and midline to lateral aspects of the eye 35. In an non-limiting example, the ultrasound transducer 30 may be configured as a 1D phased array with 32-256 elements operating at a center frequency of approximately 10.0 MHz with an 8 MHz bandwidth. This frequency range provides an optimal balance between penetration depth and resolution for imaging the optic nerve sheath, which typically lies at a depth of 3-5 mm behind the globe. The phased array configuration enables electronic beam steering and focusing, allowing for comprehensive scanning of the entire optic nerve sheath without physically moving the transducer. By scanning from superior to inferior aspects, the device 10 captures the vertical extent of the optic nerve sheath, while scanning from midline to lateral aspects enables visualization of the entire width of the structure. This comprehensive scanning approach is critical for accurate ONSD measurement, as it ensures capture of the true maximum diameter rather than an oblique cross-section that could result in measurement errors.

The ultrasound transducer 30 is integrated within the at least one lens 105 and scans superior to inferior aspects and midline to lateral aspects of the eye 35. This integration may be achieved through a composite construction technique where the transducer 30 is embedded directly into the lens 105 material during the manufacturing process, creating a seamless interface that maintains the optical and structural properties of the lens 105 while incorporating the acoustic functionality of the transducer 30. The transducer 30 is positioned in the central-inferior portion of the lens 105, optimally aligned to target the closed eye 35 when the wearable structure 15 is properly positioned on the head 20 of the user 25.

The ultrasound transducer 30 may utilize a scanning protocol that comprehensively examines the optic nerve sheath 70 from multiple angles and perspectives. When scanning from superior to inferior aspects, the transducer 30 systematically sweeps through an arc of approximately 30 degrees, capturing the vertical extent of the optic nerve sheath 70 as it exits the posterior aspect of the globe. This vertical scanning approach enables visualization of the optic nerve sheath 70 from its origin at the globe through its retrobulbar course, capturing the anatomical regions where pathological dilation most commonly occurs.

During midline to lateral scanning, the transducer 30 may perform a horizontal sweep of approximately 40 degrees, visualizing the optic nerve sheath 70 as it courses from the medial to lateral orbital space. This horizontal scanning plane is particularly valuable for detecting asymmetrical dilation patterns that may occur with certain pathological conditions such as localized mass effects or vascular malformations. The combined multi-planar scanning approach ensures complete visualization of the entire circumference of the optic nerve sheath 70, significantly reducing the likelihood of missing focal abnormalities that might be overlooked with single-plane imaging.

The scanning mechanism utilizes electronic beam steering capabilities associated with in the phased array configuration of the transducer 30, enabling rapid acquisition of multiple imaging planes without mechanical movement of the transducer 30 itself. This electronic steering is accomplished through precise timing of the excitation pulses delivered to the individual elements of the transducer 30 array, creating constructive interference patterns that effectively direct the ultrasound beam along predetermined scanning paths. The electronic beam steering operates at microsecond timescales, enabling acquisition of complete multi-planar datasets within 1-2 seconds, minimizing the effects of patient movement and physiological motion during image acquisition.

The processor 55 may implement an artificial intelligence algorithm 110 to dynamically adjust imaging parameters, including gain, depth, frequency, and focus, based on anatomical characteristics specific to the user 25. The AI algorithm 110 utilizes a sophisticated multi-layer neural network trained on a diverse dataset of ophthalmic ultrasound images from various patient demographics. Upon initial scanning, the AI algorithm 110 automatically detects the echogenicity of the ocular tissues and surrounding structures of the user 25, then adaptively modifies gain settings to optimize contrast between the fluid-filled optic nerve sheath and surrounding tissues. The depth parameter is adjusted based on real-time detection of the globe's posterior boundary to ensure that the measurement plane at 3 mm behind the globe is precisely captured. The frequency modulation capabilities allow the device 10 to adjust between 8-12 MHz depending on the detected tissue characteristics, with higher frequencies employed for patients with shallow anatomical structures and lower frequencies for deeper penetration when needed. Focus parameters are dynamically controlled through a combination of electronic focusing (adjusting the timing of firing individual transducer elements) and real-time analysis of returning echoes to maximize resolution at the precise depth of the optic nerve sheath. This adaptive approach significantly improves image quality compared to conventional ultrasound systems that rely on preset parameters or manual adjustment by operators.

The processor 55 may use deep learning-based object keypoint similarity (OKS) to identify optimal diagnostic frames and measure the ONSD at a predefined depth behind the globe of the eye 35. This advanced deep learning approach utilizes a specialized convolutional neural network architecture designed to recognize and track specific anatomical keypoints within the ultrasound images. The system is trained to identify key landmarks including the posterior boundary of the globe, the entry point of the optic nerve into the globe, and the lateral boundaries of the optic nerve sheath. The OKS algorithm mathematically quantifies the similarity between identified keypoints in consecutive frames and compares them to an ideal reference model of optic nerve sheath anatomy. This reference model incorporates the standard measurement protocol of assessing ONSD exactly 3 mm behind the globe, perpendicular to the optic nerve axis. For each captured frame, the system calculates an OKS score using the equation:

$$OKS = \frac{\sum_i \exp\left(-\frac{d_i^2}{2s^2 k_i^2}\right) \delta(v_i > 0)}{\sum_i \delta(v_i > 0)}, \quad (1)$$

where $d_i$ is the Euclidean distance between the anchor frame and the predicted keypoint; s is the Square root of the object segment area; $k_i$ is the Per-keypoint constant controlling fall-off; and $v_i$ is the Visibility flag (0=not labeled, 1=labeled but not visible, 2=visible and labeled). Frames with the highest OKS scores represent optimal alignment for accurate ONSD measurement and are automatically selected for diagnostic analysis. This approach eliminates subjective frame selection, reducing measurement variability by up to 40% compared to manual techniques, and ensures that measurements are taken at precisely the standardized location, enhancing diagnostic reliability across different operators and clinical settings.

FIG. 3A, with reference to FIGS. 1 and 2, illustrates that the fluid management system 45 may comprise a fluid reservoir 115 containing water or ultrasound gel 120; a pump 125 that transfers fluid 130 from the fluid reservoir 115 to a cavity 135 formed between the ultrasound transducer 30 and the eye 35 of the user 25; and a fluid level sensor 140 that monitors an amount of fluid 130 in the cavity 135. The fluid management system 45 utilizes a precision microfluidic architecture to ensure optimal acoustic coupling between the transducer 30 and the eye 35. The fluid reservoir 115 is constructed from biocompatible, non-reactive materials and has a capacity of approximately 10-15 ml, sufficient for multiple examination cycles without refilling. The ultrasound gel 120 is specially formulated with a viscosity of 5000-8000 centipoise and an acoustic impedance closely matching human tissue (approximately 1.63 MRayl) to minimize reflection artifacts at tissue interfaces. The pump 125 utilizes a piezoelectric micropump configuration adapted to deliver precise fluid volumes (0.1-0.5 ml per activation) at controlled flow rates (0.5-2 ml/minute) to prevent discomfort from rapid pressure changes or excessive fluid accumulation. The fluid level sensor 140 utilizes non-contact capacitive sensing technology that continuously monitors the fluid volume in the cavity 135 without introducing additional acoustic interfaces. When the fluid level falls below a predetermined threshold (for example, 0.3 ml remaining), the processor 55 automatically activates the pump 125 to replenish the coupling medium. Conversely, if excess fluid is detected, a bidirectional capability allows the pump to remove excess fluid, maintaining optimal coupling conditions while preventing fluid spillage or patient discomfort. This automated fluid management system 45 ensures consistent image quality throughout extended monitoring sessions without requiring manual intervention.

Alternatively, as shown in FIG. 3B, with reference to FIGS. 1 through 3A, the fluid management system 45 may comprise a film 145 containing a hydrogel. The hydrogel film 145 represents an alternative approach to acoustic coupling that eliminates the need for liquid management. This film 145 is composed of a cross-linked polymer network containing approximately 90% water content with strategic addition of acoustic enhancement particles. The hydrogel material is specifically engineered with a thickness of 1.0-1.5 mm and an acoustic impedance of 1.60-1.65 MRayl to closely match human tissue interfaces. The film 145 is synthesized using biocompatible polymers such as polyvinyl alcohol (PVA) or polyacrylamide with hyaluronic acid additions to enhance biocompatibility and reduce the risk of adverse reactions even during prolonged contact. The hydrogel incorporates a moisture-retention technology that prevents dehydration for up to 6-8 hours of continuous use, maintaining consistent acoustic properties throughout the examination period. The edges of the film 145 are designed with a tapered profile to create a gentle pressure gradient when applied to the periorbital region, ensuring even contact across the entire imaging area without creating pressure points. Additionally, the film 145 features a non-adhesive surface treatment that allows repeated application and removal without losing its structural integrity or acoustic properties. This solid-state coupling approach is particularly advantageous in austere environments where fluid management may be challenging, such as in microgravity conditions, during patient transport, or in extreme temperature environments where traditional coupling gels might freeze or evaporate.

Figure 4:
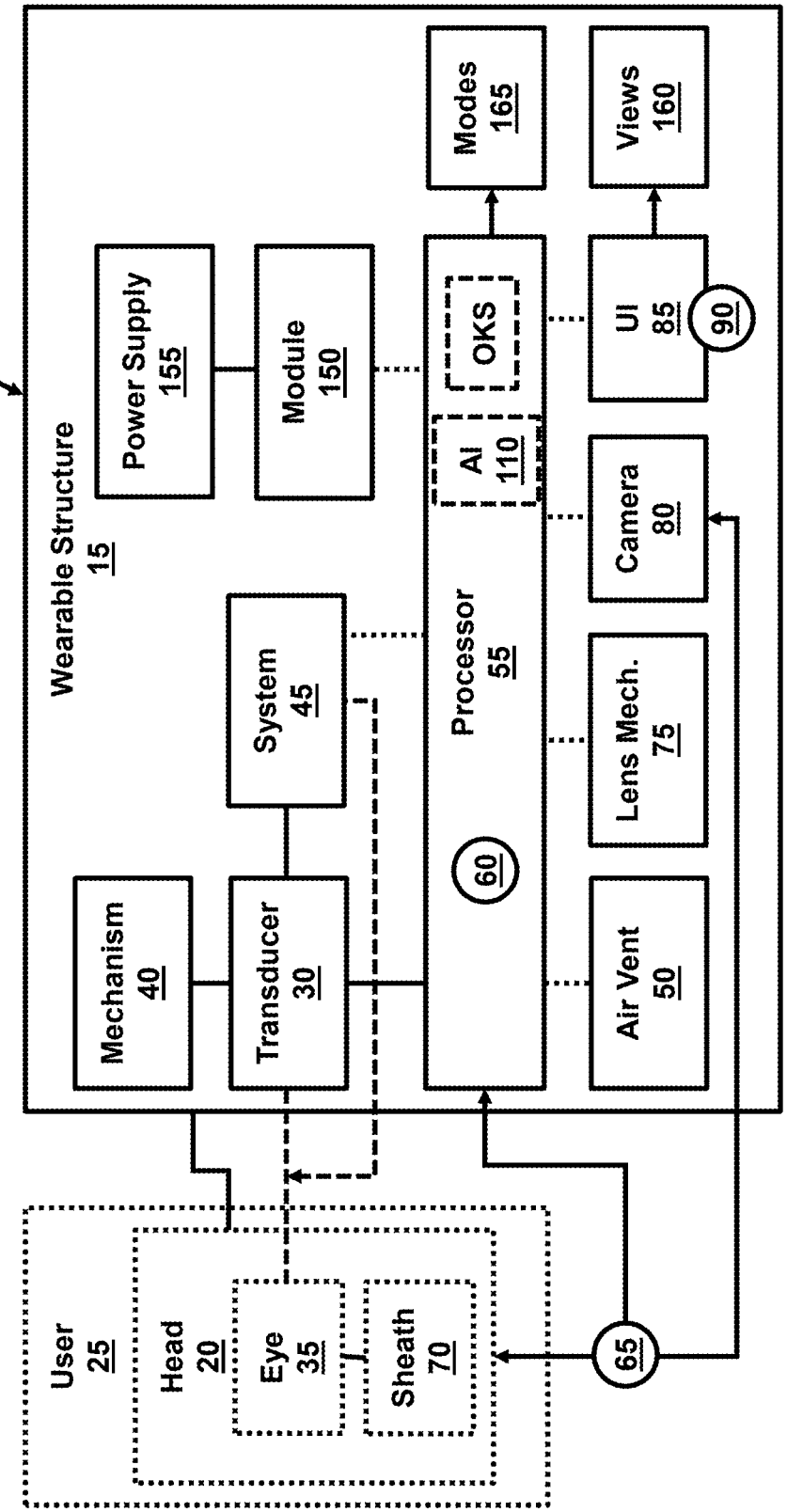
FIG. 4 is a block diagram illustrating using a power management module and other aspects of the wearable device of FIG. 1, according to an embodiment herein.

FIG. 4, with reference to FIGS. 1 through 3B, illustrates that the wearable device 10 may comprise a power management module 150 that selectively activates components of the wearable device 10 based on operational requirements and a rechargeable power supply 155 configured to support operation in remote environments. The power management module 150 implements a sophisticated hierarchical power allocation system that dynamically prioritizes system components according to their functional necessity and power consumption profiles. The module 150 utilizes a hybrid analog-digital architecture with dedicated power domains for critical versus non-critical functions. During operation, the device 10 continuously monitors power consumption patterns and remaining battery capacity, implementing four distinct power states: full-function mode (all components active), diagnostic mode (imaging and AI processing prioritized), standby mode (minimal monitoring with reduced sampling rate), and critical mode (essential functions only with maximized power conservation). The rechargeable power supply 155 may comprise a lithium-iron-phosphate (LiFePO₄) battery system selected for its exceptional safety profile in proximity to the head 20 of the user 25, high cycle life (>2000 cycles), and stable discharge characteristics even under varying temperature conditions. The battery system provides 7.2V nominal voltage with a 3200 mAh capacity, sufficient for 8-12 hours of continuous operation or up to 24 hours in power-conserving intermittent monitoring mode. The power system incorporates rapid charging capabilities (0-80% in 45 minutes) using USB-C PD (Power Delivery) standards, with built-in charge management circuitry that prevents overcharging and thermal runaway. Additionally, the power management module 150 supports hot-swappable battery operation through an auxiliary power port, allowing battery replacement without interrupting monitoring in critical scenarios. For extended deployments in remote environments, the device 10 includes compatibility with standard external power sources including solar chargers, vehicle power systems, and universal AC adapters (100-240V), ensuring operational capability across diverse field conditions.

The graphical user interface 85 may provide customizable diagnostic views 160, including trend graphs, confidence scores, and real-time alerts. The device 10 may operate in dual operational modes 165 supporting continuous and intermittent monitoring. The graphical user interface 85 utilizes a multimodal interaction framework configured for intuitive operation by both expert and novice users across various clinical environments. In an example, the primary display features a high-contrast OLED screen and anti-reflective coating for visibility in diverse lighting conditions. The interface architecture follows a three-tier information hierarchy: (1) Critical diagnostics-prominently displaying current ONSD measurements with color-coded threshold indicators (green for normal range, yellow for borderline, red for elevated values); (2) Contextual information-showing trend graphs plotting ONSD values over time with selectable timeframes (last 30 minutes, 1 hour, 4 hours, or 24 hours) and annotated clinical events; and (3) System status indicators-displaying battery level, connectivity status, and measurement confidence scores. The customizable diagnostic views 160 allow clinicians to prioritize specific information relevant to their clinical workflow, such as expanded trend analysis for neurointensivists or simplified threshold alerts for emergency responders. The graphical user interface 85 may incorporate a touch-based interaction model supplemented by physical control buttons for gloved operation in surgical or field environments. Real-time alerts utilize both visual cues (flashing indicators and customizable threshold lines) and audible notifications with adjustable volume settings suitable for quiet ICU environments or noisy field conditions. The dual operational modes 165 are seamlessly integrated into the graphical user interface 85, allowing users to switch between continuous monitoring (capturing data at 1-minute intervals) and intermittent monitoring (scheduled assessments at user-defined intervals from 15 minutes to 4 hours) with a single interaction. The dual operational modes 165 significantly reduces the cognitive load on clinicians while maximizing information density, enabling rapid clinical decision-making even in high-pressure or resource-constrained environments.

FIGS. 5A through 5G, with reference to FIGS. 1 through 4, are flow diagrams illustrating a method 200 for non-invasive monitoring of ICP. As shown in FIG. 5A, the method 200 comprises securing (205) a wearable ultrasound device 10 to a head 20 of a user 25, the wearable ultrasound device 10 comprising at least one ultrasound transducer 30 positioned to align with an eye 35 of the user 25; establishing (210) an acoustic coupling medium (e.g., fluid management system 45, for example) between the ultrasound transducer 30 and the eye 35 of the user 25; employing (215) a reinforcement learning-based control system 60 to dynamically adjust a position and angulation of the ultrasound transducer 30 to optimize image quality; filling (220) a cavity 135 between the transducer 30 and the eye 35 of the user 25 with fluid 130 while continuously monitoring fluid levels with a sensor 140; regulating (225) pressure and airflow in the device 10 to ensure stable imaging conditions; acquiring (230) ultrasound images 65 of an optic nerve sheath 70 using the ultrasound transducer 30; analyzing (235) the ultrasound images 65 to measure an optic nerve sheath diameter (ONSD); determining (240) a likelihood of elevated intracranial pressure based on the measured ONSD; and displaying (245) diagnostic information 90 based on the determined likelihood of elevated intracranial pressure.

The securing step (205) involves a precise protocol designed to ensure optimal positioning and stability of the device 10. Initially, the device 10 is oriented with the transducer 30 housing aligned with the superior orbital rim of the user 25. The wearable structure 15 is then gently lowered onto the face of the user 25, ensuring that the lens 105 centered over the eye 35 creates a proper seal around the orbital region. When implemented as googles, the adjustable head straps of the wearable structure 15 are sequentially tightened ensuring even pressure distribution around the cranial circumference. The proper tension may be verified by: (i) confirming that the device 10 remains stable during mild head movement, (ii) ensuring user 25 comfort through verbal feedback, and (iii) verifying that the alignment indicators on the frame align with anatomical landmarks (lateral canthus and mid-pupillary line).

The continuous monitoring mode is particularly valuable in several specific scenarios: critical care units where ongoing updates for patients at high risk of secondary brain injuries are essential; combat scenarios where medics must make rapid triage decisions in high-pressure environments; and disaster zones where patient conditions may change rapidly with limited access to advanced neurological assessment tools. Conversely, the intermittent monitoring mode serves different but equally important settings: outpatient clinics tracking the longitudinal progression of ICP-related conditions; field hospitals with limited power resources needing to conserve energy while still providing periodic assessments; and remote medical facilities where regular but not continuous monitoring is required for patient management. The method 200 automatically adjusts power utilization, scanning frequency, and data storage parameters based on the selected mode to optimize performance for each specific use case.

Next, upon initial device 10 placement, the method 200 performs an acoustic interface quality assessment in step (210) to evaluate pre-existing coupling conditions. Based on this assessment, the method 200 determines the optimal coupling approach from multiple available methods. For example, medical-grade ultrasound gel 120 is dispensed from the fluid reservoir 115 through microfluidic channels embedded within the wearable structure 15. The gel 120 delivery is controlled by the piezoelectric micropump 125, which dispenses an initial volume of approximately 0.3-0.5 ml at a precisely controlled flow rate of 0.8-1.2 ml/minute to prevent user 25 discomfort from sudden pressure changes. The gel 120 is maintained at body temperature (35-37° C.) through an integrated warming element to enhance user 25 comfort and optimize acoustic properties. The fluid management system 45 utilizes real-time impedance matching calculations to verify coupling quality, adjusting fluid volume as needed to achieve optimal acoustic transmission. Alternatively, in scenarios where liquid management presents challenges (such as in microgravity environments or extreme field conditions), the method 200 can utilize a specialized hydrogel film 145 (e.g., (e.g., Tegaderm® film, available from Solventum Intellectual Properties Company, Delaware, USA, or a comparable material) with 90% water content that provides equivalent acoustic coupling without requiring active fluid management. The establishment of acoustic coupling is verified through automated quality checks that measure signal return characteristics, ensuring adequate coupling before proceeding to subsequent imaging steps. Throughout the monitoring session, the coupling quality is continuously assessed, with automatic adjustments implemented to maintain optimal acoustic transmission properties.

Next, in step (215), the reinforcement learning-based control system 60 begins operation by performing a rapid initial scanning sequence spanning the potential location space of the optic nerve sheath 70. During this exploratory phase, the system 60 captures multiple low-resolution preview frames while systematically varying the transducer 30 position across all six degrees of freedom: three translational (superior-inferior, medial-lateral, anterior-posterior) and three rotational (pitch, yaw, roll). Each captured frame is instantaneously analyzed by a specialized convolutional neural network that evaluates image quality based on multiple parameters including tissue boundary definition, signal-to-noise ratio, and anatomical landmark visibility. These quality assessments serve as reward signals within the reinforcement learning framework, guiding subsequent positioning decisions through a deep Q-network architecture. The system 60 employs an adaptive exploration-exploitation strategy that initially favors broad position sampling before progressively focusing on regions yielding higher-quality images. Real-time feedback loops enable the system 60 to respond to subtle changes in patient positioning or physiological movements, maintaining optimal transducer 30 alignment throughout the examination. The reinforcement learning algorithms continuously refine their positioning strategies based on accumulated experience, incorporating both current session data and historical performance patterns from previous examinations. This dynamic optimization process typically converges on an optimal transducer 30 position within 3-5 seconds, significantly faster than manual positioning approaches while achieving superior consistency in imaging plane selection.

In the filling step (220), the system enters a continuous monitoring and maintenance phase for the acoustic interface. The cavity 135, which typically has a volume capacity of 0.8-1.2 ml, is maintained at an optimal fill level of approximately 70-80% capacity to prevent both inadequate coupling and excessive pressure. The fluid level sensor 140 employs non-contact capacitive sensing technology with a measurement resolution of ±0.05 ml, taking readings at 10 Hz to provide real-time status of coupling conditions. A fluid delivery algorithm performed by processor 55 adjusts the micropump 125 output characteristics based on both absolute fluid levels and rate-of-change calculations, compensating for factors such as evaporation, minor leakage, or position-dependent fluid redistribution. If the fluid level sensor 140 detects a drop below the minimum threshold (typically 0.3 ml remaining), it triggers a precise replenishment cycle that dispenses additional ultrasound gel 120 in small increments (0.1-0.2 ml) until optimal levels are restored. Conversely, if excess fluid accumulation is detected (>0.9 ml), the bidirectional capability of the pump 125 activates to remove excess fluid, preventing potential leakage or user 25 discomfort. The method 200 also monitors fluid distribution patterns within the cavity 135, detecting potential air pockets or uneven coverage that might compromise image quality. Throughout this process, all fluid management activities are logged with timestamps, creating a comprehensive record of coupling conditions that can be correlated with image quality metrics for retrospective analysis.

The pressure regulation step (225) begins with an initial calibration phase that establishes baseline pressure values referenced to ambient conditions. The system 50 then implements active pressure management using bidirectional microvalves positioned at strategic locations around the perimeter of the wearable structure 15. These valves respond to pressure differential measurements from integrated sensors, maintaining the internal environment at a slight negative pressure (typically −1 to −3 mm $H_2O$ relative to ambient) to ensure the acoustic coupling medium remains properly positioned while preventing excessive pressure on ocular tissues. The airflow component of regulation addresses multiple challenges: thermal management, humidity control, and condensation prevention. A network of micro-channels directs a gentle airflow pattern across the interior surfaces of the lens 105, preventing fog formation that could obstruct visualization while minimizing evaporative loss from the coupling medium. The airflow volume may be controlled at 15-30 ml/minute, sufficient for environmental management while remaining below the threshold of user 25 perception. During rapid environmental transitions, such as temperature or altitude changes, the system 50 implements adaptive response protocols that temporarily increase airflow rates and adjust pressure parameters to maintain stable conditions. The pressure and airflow regulation system 50 also incorporates safety features including maximum pressure limiters, automatic emergency venting capabilities for sudden pressure changes, and redundant sensing systems that ensure reliable operation even if primary sensors experience drift or failure. Throughout the monitoring session, the system 50 continuously logs environmental parameters including pressure, temperature, and humidity, correlating these with image quality metrics to identify optimal operating conditions for future sessions.

Once optimal transducer 30 positioning has been established by the reinforcement learning-based control system 60, the image acquisition sequence is initiated in step (230). The transducer 30 first performs a preliminary B-mode sweep spanning approximately 30 degrees in both superior-inferior and medial-lateral directions to localize the optic nerve sheath 70 within the imaging field. The method 200 then automatically optimizes imaging parameters based on tissue characteristics detected in this preliminary scan. These parameters include transmit frequency (typically adjusted between 8-12 MHz based on penetration requirements), gain settings (automatically calibrated to maximize contrast between the fluid-filled nerve sheath and surrounding tissues), focus depth (precisely positioned at the expected location of the optic nerve sheath 70, typically 3-5 mm behind the globe), and frame rate (adjusted between 15-30 Hz depending on whether static or dynamic assessment is being performed). Following parameter optimization, the method 200 acquires a comprehensive dataset consisting of multiple imaging planes capturing the optic nerve sheath 70 from various angles. This multi-planar approach includes standard axial views (perpendicular to the visual axis), longitudinal views (parallel to the visual axis), and oblique views that may reveal anatomical variations not visible in standard planes. For each imaging plane, the method 200 captures both single high-resolution frames optimized for morphological assessment and short cine loops (3-5 seconds) that capture dynamic characteristics such as pulsatility. Advanced imaging modes including tissue harmonic imaging, speckle reduction filtering, and compound imaging may be applied to enhance boundary definition and reduce artifacts. Throughout the acquisition process, real-time quality assessment algorithms continuously evaluate image characteristics, triggering automatic reacquisition if quality metrics fall below predetermined thresholds due to factors such as patient movement or transient coupling degradation.

The analyzing step (235) begins with an automated frame selection process that evaluates all acquired images 65 against predetermined quality criteria. For each frame, a specialized convolutional neural network assesses quality factors including boundary definition clarity, anatomical landmark visibility, measurement plane alignment, and freedom from artifacts. Only frames exceeding quality thresholds (typically >85% on a composite quality score) proceed to measurement analysis. Using the selected optimal frames, the method 200 implements automated anatomical landmark detection to identify key structures including the posterior boundary of the globe, the entry point of the optic nerve, and the lateral boundaries of the optic nerve sheath 70. The measurement algorithm then automatically positions measurement calipers at the standardized location of 3 mm posterior to the globe along the axis of the optic nerve, consistent with established measurement protocols. At this precise location, the method 200 measures the perpendicular distance between the outer hypoechoic bands representing the optic nerve sheath 70 boundaries, calculating the ONSD with a precision of ±0.1 mm. To enhance measurement reliability, the method 200 performs multiple measurements on different frames and across multiple imaging planes when available, applying statistical methods to identify and eliminate outliers. The final ONSD value is reported with confidence intervals that reflect both measurement precision and inter-frame variability. For longitudinal monitoring applications, the system maintains a database of previous measurements for each patient, enabling automated detection of significant changes from baseline. Advanced analysis features include automated detection of asymmetry between left and right eyes (when bilateral measurements are available), assessment of pulsatility characteristics when cine loops are captured, and correlation of ONSD values with other measured parameters such as ophthalmic artery flow velocities when Doppler data is available.

The determination process (240) begins by comparing the measured ONSD against individualized threshold values derived from comprehensive normative databases. Rather than applying universal cutoff values, the method 200 implements a personalized threshold calculation that adjusts reference ranges based on patient demographics including age, sex, race/ethnicity, and body mass index. These adjustments are particularly important for pediatric users 25, where normal ONSD values vary significantly with age, and for populations with anatomical variations that affect baseline measurements. For adult users 25, the method 200 typically applies a base threshold of 5.0-5.9 mm (varying by demographic factors) with values above this range indicating possible elevated intracranial pressure. The raw measurement is then processed through a probabilistic model that transforms the absolute ONSD value into a likelihood score ranging from 0-100%, representing the probability of elevated intracranial pressure. This model incorporates both the magnitude of threshold deviation and measurement confidence factors, providing a more nuanced assessment than binary normal/abnormal categorization. For users 25 with historical measurement data available, the system calculates the percentage change from baseline, identifying significant deviations that may indicate evolving pathology even when absolute values remain within normal ranges. The determination algorithm also incorporates temporal trend analysis for continuous monitoring applications, calculating rates of change and pattern characteristics that may provide early warning of developing pressure elevation. When multiple diagnostic parameters are available (such as pulsatility indices or ophthalmic artery flow measurements), the method 200 employs a multivariate Bayesian model that integrates these diverse inputs to generate a composite likelihood assessment with enhanced specificity and sensitivity compared to single-parameter approaches.

The diagnostic information 90 is presented through the graphical user interface 85 in a multi-tiered structure that balances immediate actionability with comprehensive detail in the displaying step (245). At the highest level, the interface 85 presents a color-coded status indicator (green for normal, yellow for borderline, red for elevated) providing immediate assessment at a glance, critical for emergency settings or non-specialist users. Supporting this top-level indicator, primary diagnostic elements display the current ONSD measurement with precision of 0.1 mm, accompanied by reference ranges adjusted for the specific user's 25 demographic characteristics. For each measurement, the processor 55 calculates a confidence score derived from image quality metrics and measurement reliability factors, enabling appropriate weighting of results in clinical decision-making. Trend visualization components present ONSD values over configurable timeframes (minutes to days depending on monitoring duration), with annotations for clinical events, interventions, or environmental changes that may influence measurements. For continuous monitoring applications, the interface 85 provides rate-of-change indicators and alerts for values exceeding threshold rates that may signify rapid ICP elevation requiring immediate intervention. The method 200 supports context-sensitive display modes optimized for different use scenarios, including a simplified high-contrast mode for emergency settings, a detailed analytical mode for neurocritical care, and a remote monitoring mode optimized for telemedicine applications. All displayed information 90 is automatically logged with timestamps to create a comprehensive record for later review, with export capabilities for integration with electronic medical records or research databases.

As shown in FIG. 5B, the method 200 may comprise selecting (250) optimal diagnostic frames from the acquired ultrasound images 65 using a deep learning model trained to evaluate object keypoint similarity metrics. The frame selection process utilizes a specialized deep convolutional neural network specifically optimized for ultrasound image analysis. The model is trained on a diverse dataset of thousands of expertly annotated ophthalmic ultrasound images representing various pathological states, patient demographics, and image quality conditions. The network processes each frame through multiple convolutional layers with residual connections to extract hierarchical feature representations, followed by attention mechanisms that focus computational resources on anatomically significant regions. For each frame, the model identifies multiple anatomical keypoints including the anterior and posterior boundaries of the globe, the hypoechoic region representing the optic nerve, and the hyperechoic bands corresponding to the optic nerve sheath boundaries. The algorithm then calculates comprehensive OKS metrics by comparing the spatial relationships between these identified keypoints and a gold-standard reference model, incorporating both distance-based similarity and keypoint confidence scores. Frames exceeding a predetermined quality threshold (typically OKS>0.85) are retained, while suboptimal frames are filtered out. From the retained high-quality frames, the algorithm selects the optimal diagnostic frame that best satisfies measurement criteria, including perpendicularity to the optic nerve axis, clear visualization of the sheath boundaries, and precise positioning at 3 mm behind the globe. This automated selection process reduces selection bias and ensures measurement consistency that surpasses manual frame selection when compared to traditional methods.

As shown in FIG. 5C, the method 200 may comprise cross-validating (255) ONSD measurements with other diagnostic metrics, including pulsatility indices, optic nerve sheath elasticity, and vascular flow parameters, for enhanced ICP assessment. This multimodal diagnostic approach significantly enhances the accuracy and reliability of ICP assessment by incorporating complementary physiological markers beyond static ONSD measurements. The pulsatility index (PI) is calculated using Doppler ultrasound measurements of the central retinal artery or ophthalmic artery, quantifying the ratio between peak systolic velocity minus end-diastolic velocity, divided by mean flow velocity ((PSV-EDV)/MFV). Elevated PI values (>1.2) suggest increased downstream vascular resistance, which often correlates with elevated ICP. The method 200 calculates PI values automatically from the same ultrasound data used for ONSD measurement, applying advanced signal processing algorithms to extract flow velocity patterns. Optic nerve sheath elasticity assessment utilizes a novel application of ultrasound elastography techniques, where tiny mechanical impulses (generated by variably timed ultrasound pulses) induce subtle tissue displacements that are tracked and quantified. Reduced elasticity (increased stiffness) correlates with elevated ICP due to increased CSF tension within the nerve sheath 70. The method 200 measures sheath strain ratios relative to surrounding tissue, with ratios below 0.7 suggesting elevated ICP. For vascular flow assessment, the method 200 analyzes flow velocity waveforms from orbital vessels, calculating parameters including resistivity indices, flow acceleration times, and waveform morphology characteristics. The cross-validation process may employ a Bayesian network that combines these multimodal inputs, weighting each parameter according to its diagnostic reliability based on patient-specific factors and signal quality metrics. This integrated approach improves the diagnostic accuracy for detecting elevated ICP compared to ONSD measurements alone, particularly in borderline cases where a single parameter might yield ambiguous results.

As shown in FIG. 5D, analyzing (235) the ultrasound images 65 may comprise measuring (260) the ONSD at a predefined distance behind the globe of the eye 35 using automated landmark detection. The automated landmark detection process utilizes a specialized deep learning architecture combining segmentation and regression approaches to precisely identify the critical measurement points. The neural network architecture may incorporate a hybrid design with a ResNet backbone for feature extraction, followed by parallel branches for segmentation and keypoint detection tasks. The segmentation branch generates pixelwise probability maps for key anatomical structures (globe, optic nerve, nerve sheath boundaries), while the keypoint detection branch specifically identifies the precise landmarks needed for standardized measurement. The method 200 first locates the posterior boundary of the globe using edge detection algorithms enhanced by learned features that differentiate true anatomical boundaries from imaging artifacts. From this boundary, the algorithm automatically calculates the exact 3 mm posterior position along the central axis of the optic nerve. At this predefined distance, the method 200 identifies the hypoechoic band representing the optic nerve and measures the perpendicular distance between the hyperechoic boundaries of the nerve sheath. The measurement process incorporates advanced sub-pixel interpolation techniques to achieve measurement precision of approximately 0.1 mm, exceeding the nominal resolution limit of the ultrasound system. To ensure measurement reliability, the algorithm performs multiple measurements at slightly different positions within the identified plane and applies statistical methods to eliminate outliers and calculate confidence intervals for the final measurement. This automated approach standardizes the measurement process according to established clinical protocols while eliminating the variability associated with manual caliper placement, resulting in highly reproducible ONSD values that correlate strongly with direct ICP measurements (r>0.85 in validation studies).

As shown in FIG. 5E, the method 200 may comprise personalizing (265) threshold values for ONSD measurements based on demographic factors specific to the user 25 to improve diagnostic accuracy. This personalization framework addresses the well-documented variations in normal ONSD values across different populations, enhancing diagnostic precision by tailoring threshold values to individual patient characteristics. The method 200 incorporates a comprehensive database of normative ONSD values stratified by key demographic factors including age, sex, race/ethnicity, and body mass index (BMI). For pediatric patients, the personalization algorithm incorporates age-specific normative ranges that account for the developmental changes in optic nerve sheath anatomy, with distinct reference ranges for neonates (0-28 days), infants (1-12 months), young children (1-6 years), older children (7-12 years), and adolescents (13-18 years). For adult patients, the algorithm adjusts threshold values based on sex (with females typically having slightly smaller baseline ONSD values than males) and race/ethnicity (accounting for documented variations across different population groups). The personalization process begins with the acquisition of patient demographic data through either manual input or integration with electronic health records. The method 200 then calculates a personalized threshold by applying a multivariate regression model that integrates the relevant demographic factors, producing both a baseline normal value and an elevated threshold value specific to that individual. This approach significantly improves diagnostic specificity by reducing false positives in populations with naturally larger ONSD baselines and increasing sensitivity in populations with smaller baselines.

As shown in FIG. 5F, the method 200 may comprise operating (270) the wearable ultrasound device 10 in either continuous monitoring mode for real-time ICP tracking or intermittent monitoring mode for periodic assessment. The dual operational modes 165 are configured to accommodate diverse clinical scenarios while optimizing power consumption, data storage, and clinical workflow integration. In continuous monitoring mode, the system acquires full ultrasound sequences at predefined intervals (typically every 1-5 minutes, adjustable based on clinical acuity) and performs real-time ONSD measurements with trend analysis. This mode utilizes motion compensation algorithms that detect and correct for minor patient movements, maintaining consistent imaging planes across sequential measurements. The method 200 applies temporal filtering techniques to smooth measurement variability while preserving clinically significant trends, and calculates rate-of-change metrics that can alert clinicians to rapid ICP fluctuations before absolute thresholds are crossed. The continuous mode is particularly valuable in neurocritical care settings, during patient transport, or in the immediate post-operative period when rapid ICP changes may occur. In intermittent monitoring mode, the method 200 performs scheduled assessments at clinician-defined intervals (ranging from 15 minutes to 8 hours) with optimized power management between acquisitions. During inactive periods, the method 200 enters a low-power state while maintaining essential functions and environmental monitoring. Before each scheduled acquisition, the method 200 performs a brief pre-scan calibration sequence to optimize transducer positioning and imaging parameters based on current conditions. This mode is ideal for stable patients requiring ongoing monitoring, outpatient follow-up, or extended deployment in resource-constrained environments. The method 200 provides seamless transitions between modes without requiring device removal or recalibration, allowing clinicians to adjust monitoring intensity based on changing patient conditions or resource availability. Both modes incorporate adaptive scheduling algorithms that can automatically increase monitoring frequency if measurements approach or exceed threshold values, ensuring closer surveillance when clinical conditions warrant.

As shown in FIG. 5G, the method 200 may comprise archiving (275) acquisition parameters, diagnostic data, and metadata for integration with electronic health records; and wirelessly transmitting (280) the diagnostic information 90 to a remote monitoring system 93. This comprehensive data management process ensures seamless documentation, integration, and accessibility of diagnostic information across diverse clinical workflows and information systems. For each examination session, the method 200 archives a complete data package including raw ultrasound images, processed measurement data, device settings, environmental conditions, and patient-specific parameters. Acquisition parameters are documented in detail, including transducer frequency, gain settings, depth settings, and frame rates, allowing for standardized comparisons across multiple assessments and different operators. The diagnostic data package includes both raw measurements and derived clinical interpretations, with confidence scores and quality metrics for each measurement. Each data point is timestamped and linked to patient identifiers via secure encryption protocols compliant with healthcare data protection regulations. The wireless transmission capabilities utilize a multi-tier communication architecture supporting various protocols including Bluetooth® Low Energy (BLE) for short-range device-to-device transmission, Wi-Fi® transmission for hospital network integration, and optional cellular connectivity for remote monitoring in field settings. Data transmission utilizes AES-256 encryption with mutual authentication protocols to ensure data security while in transit. The remote monitoring system 93 provides a web-based interface allowing authorized clinicians to access real-time and historical monitoring data from any location, with customizable alerts that can be delivered via email, SMS, or integration with hospital communication systems. For environments with limited connectivity, the method 200 incorporates store-and-forward capabilities, caching data locally until connection is established, then synchronizing with central databases when possible. This comprehensive approach to data management ensures that critical ICP monitoring information is securely captured, accessible when needed, and seamlessly integrated into the broader patient care documentation ecosystem.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

Beyond basic data transmission, the embodiments herein support cloud-based analysis where imaging data can be transmitted to secure platforms for advanced diagnostics and longitudinal trend analysis. Moreover, the method 200 may integrate with hospital electronic medical records (EMR) and PACS systems for streamlined clinical workflow. In group medical operations, such as military deployments or disaster response, multiple devices can communicate with a central command system, enabling coordinated monitoring across multiple patients and facilitating resource allocation based on real-time ICP tracking data.

Figure 6A:
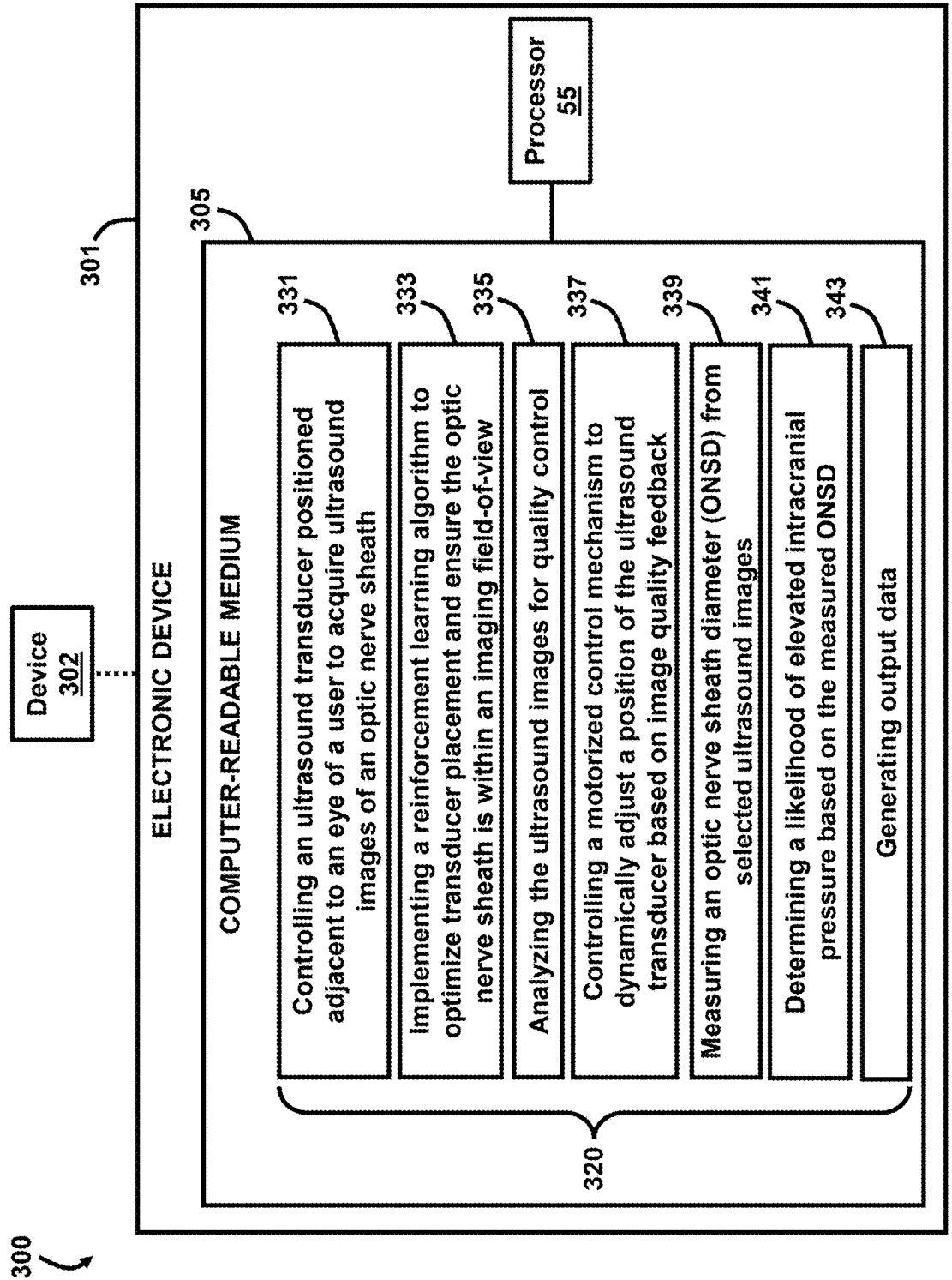
FIGS. 6A and 6B are block diagrams illustrating a system for non-invasive ICP monitoring, according to an embodiment herein.
Figure 6B:
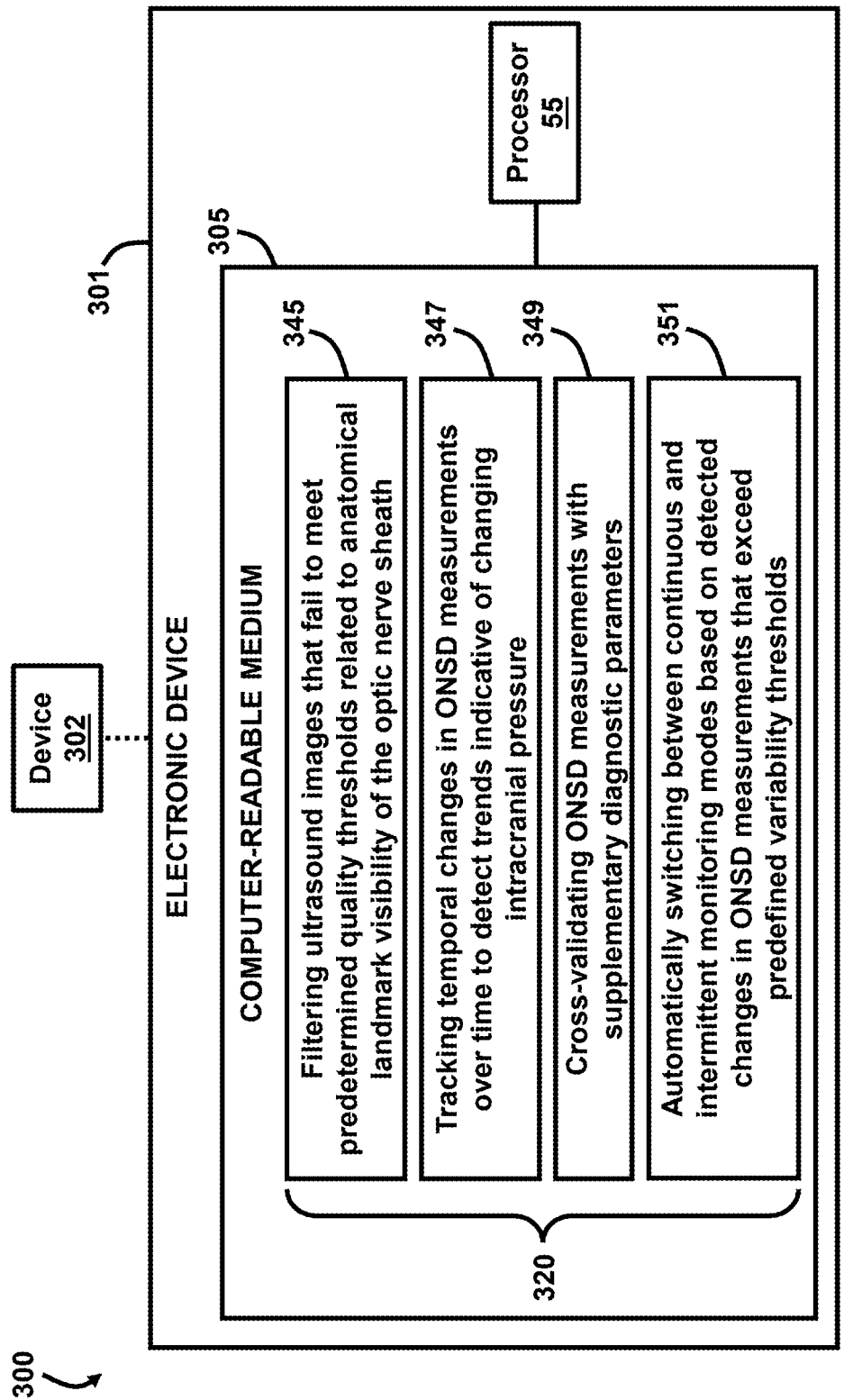

FIGS. 6A and 6B, with reference to FIGS. 1A through 5G, illustrates another example of a system 300 for non-invasive ICP monitoring. According to an example, the system 300 comprises an electronic device 301 containing a computer-readable storage medium 305, and a remote communication device 302 communicatively linked to the electronic device 301. In the example of FIGS. 6A and 6B, the electronic device 301 includes processor 55 and computer-readable storage medium 305. Processor 55 may include a central processing unit, microprocessors, hardware engines, and/or other hardware devices suitable for retrieval and execution of instructions stored in a computer-readable storage medium 305, for example. Processor 55 may fetch, decode, and execute computer-executable instructions 320 to enable execution of locally-hosted or remotely-hosted applications for controlling action of the electronic device 301. The remotely-hosted applications may be accessible on remotely-located devices; for example, the remote communication device 302. For example, the remote communication device 302 may be a laptop computer, tablet device, smartphone, or notebook computer. As an alternative or in addition to retrieving and executing instructions, processor 55 may include electronic circuits including a number of electronic components for performing the functionality of the computer-executable instructions 320.

The computer-readable storage medium 305 may be any electronic, magnetic, optical, or other physical storage device that stores executable instructions 320. Thus, the computer-readable storage medium 305 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the computer-readable storage medium 305 may include a non-transitory computer-readable storage medium 305. The computer-readable storage medium 305 may be encoded with executable instructions 320 for enabling execution of remotely-hosted applications accessed on the remote communication device 302. In an example, the processor 55 of the electronic device 301 executes the computer-executable instructions 320 that when executed cause the processor 50 of the electronic device 301 to perform a method provided by the computer-executable instructions 331-351.

As shown in the example of FIG. 6A, the computer-readable medium 305 is configured for storing computer-executable instructions 320 that, when executed by a processor 55, cause the processor 55 to perform the computer-executable instructions 320 comprising controlling (331) an ultrasound transducer 30 positioned adjacent to an eye 35 of a user 25 to acquire ultrasound images 65 of an optic nerve sheath 70; implementing (333) a reinforcement learning algorithm to optimize transducer 30 placement and ensure the optic nerve sheath 70 is within an imaging field-of-view; analyzing (335) the ultrasound images 65 for quality control, including automatically filtering low-quality frames; controlling (337) a motorized control mechanism 40 with six degrees of freedom to dynamically adjust a position of the ultrasound transducer 30 based on image quality feedback; measuring (339) an optic nerve sheath diameter (ONSD) from selected ultrasound images 65; determining (341) a likelihood of elevated intracranial pressure based on the measured ONSD; and generating (343) output data including a quality score, diagnostic measurements, confidence scores, and alerts.

As shown in the example of FIG. 6A, the computer-readable medium 305 is configured for storing computer-executable instructions 320 that, when executed by a processor 55, cause the processor 55 to perform the computer-executable instructions 320 comprising controlling (331) an ultrasound transducer 30 positioned adjacent to an eye 35 of a user 25 to acquire ultrasound images 65 of an optic nerve sheath 70. This controlling function 331 encompasses sophisticated signal generation, beam management, and image formation algorithms specifically optimized for ophthalmic ultrasound applications. The processor 55 coordinates the generation of precisely timed excitation pulses with specific amplitude, frequency, and phase characteristics tailored to the acoustic properties of ocular tissues. These pulses are digitally synthesized with a sampling frequency of 100 MHz and 12-bit amplitude resolution, enabling fine control over the acoustic waveform shape.

For the ultrasound transducer 30, the processor 55 implements dynamic aperture control that selectively activates specific elements within the 32-256 element array based on the desired imaging depth and field of view. When imaging the optic nerve sheath 70, which typically lies at a depth of 3-5 mm behind the globe, the system 300 employs a specialized activation sequence that begins with a narrow aperture (8-16 elements) for transmission to achieve high lateral resolution, followed by expanded aperture (32-64 elements) for reception to maximize sensitivity. The processor 55 also manages adaptive focusing algorithms that dynamically adjust the focal zone positions based on detected anatomical structures, ensuring optimal resolution at the critical measurement regions.

The controlling function (331) incorporates real-time pulse sequence management that automatically switches between different imaging modes based on the current task. During initial localization, the system 300 employs a wide-field, lower-resolution mode covering a 30° scanning sector. Once the optic nerve sheath 70 is located, the system 300 transitions to a high-resolution mode with narrower field of view) (15-20° centered on the target structure. For B-mode imaging, the processor 55 manages line density (typically 128-256 lines per frame), persistence settings (3-5 frame averaging for static assessment, 1-2 frame averaging for dynamic assessment), and frame rate (adjustable between 15-30 Hz based on the specific imaging task).

The processor 55 may implement signal processing chains for the received echoes, including time-gain compensation to account for depth-dependent attenuation, adaptive noise filtering optimized for the frequency characteristics of ophthalmic ultrasound, and specialized edge enhancement algorithms that improve boundary definition for the optic nerve sheath 70 while minimizing artifacts. These processing parameters are continuously optimized based on real-time analysis of image characteristics, ensuring consistent image quality across different patients and environmental conditions.

In the implementing function (333), the processor 55 may execute a deep Q-network (DQN) architecture specifically designed for real-time optimization of ultrasound transducer 30 positioning. Unlike traditional supervised learning approaches, this reinforcement learning system learns optimal control policies through continuous interaction with the environment, maximizing long-term rewards associated with high-quality image acquisition.

The state space of the reinforcement learning model encompasses multiple dimensions of information: current transducer 30 position and orientation parameters (X, Y, Z coordinates and pitch, yaw, roll angles), real-time image quality metrics (contrast ratio, signal-to-noise ratio, boundary definition sharpness), and anatomical landmark detection confidence scores (probability values for globe boundary, optic nerve entry point, and nerve sheath margins). This comprehensive state representation enables the algorithm to develop nuanced positioning strategies that account for both device positioning and resulting image characteristics.

The action space includes fine-grained adjustments to the six degrees of freedom controlled by the motorized control mechanism 40: three translational axes (superior-inferior, medial-lateral, anterior-posterior) with movement increments of 0.1-0.5 mm, and three rotational axes (pitch, yaw, roll) with angular increments of 0.5-2.0 degrees. This granular control enables precise positioning adjustments while maintaining patient comfort. The reward function is carefully designed to balance multiple objectives, incorporating image quality metrics (contrast, resolution, signal-to-noise ratio), anatomical landmark visibility (clarity of optic nerve sheath 70 boundaries), and measurement plane alignment (perpendicularity to the optic nerve axis). Higher rewards are assigned for optimal positioning that maximizes ONSD measurement accuracy and reliability. The reward calculation employs a weighted combination approach that prioritizes anatomical landmark visibility (40% of total reward), measurement plane alignment (30%), and image quality metrics (30%), creating a balanced optimization objective that ensures both clear visualization and accurate measurement capability.

In the analyzing function (335), the quality control system begins with a frame-level assessment that evaluates each acquired ultrasound image 65 against multiple quality criteria. The processor 55 executes a convolutional neural network that has been trained on thousands of annotated ophthalmic ultrasound images to recognize characteristics of diagnostic-quality imaging. For each frame, the quality assessment generates scores across five critical dimensions: signal-to-noise ratio (quantifying the level of random noise relative to tissue signals), contrast ratio (measuring the distinction between the hypoechoic optic nerve sheath 70 and surrounding hyperechoic tissues), boundary definition (evaluating the sharpness of tissue interfaces critical for measurement), anatomical completeness (assessing whether all required structures are visible within the field of view), and artifact presence (detecting common imaging artifacts such as reverberations, shadowing, or ring-down artifacts that may compromise diagnostic accuracy).

These individual quality metrics are combined into a composite quality score ranging from 0-100, with predetermined thresholds (typically 75-85 depending on the specific clinical application) determining which frames are retained for further analysis. Frames falling below these thresholds are automatically filtered out before progressing to measurement stages, ensuring that only high-quality data informs clinical decision-making. For continuous monitoring applications, the processor 55 implements a temporal consistency check that identifies sudden changes in image quality that might indicate probe displacement or coupling degradation, triggering automatic repositioning sequences when necessary.

Beyond binary filtering decisions, the quality analysis generates confidence metrics for each retained frame that are propagated through subsequent analysis stages, enabling appropriate weighting of measurements based on their underlying image quality. These detailed quality assessments are also logged to provide quality assurance documentation and support retrospective analysis of system performance. The processor 55 continuously refines quality assessment parameters based on accumulated experience, enabling adaptation to different imaging conditions and patient characteristics without requiring manual recalibration.

During the controlling function (337), the processor 55 translates high-level positioning decisions into precise motor control commands through the motion control system (i.e., control mechanism 40). This control function begins with a coordinate transformation process that converts desired transducer 30 positions from the imaging coordinate system (based on anatomical references) to the mechanical coordinate system of the motorized control mechanism 40, accounting for the specific kinematic relationships of the multi-linkage mechanical assembly. For each positioning adjustment, the processor 55 generates optimized motion trajectories that balance positioning accuracy, movement speed, and patient comfort. The motion control algorithms employ closed-loop feedback using optical encoder data from each motor (with resolution of 0.1 mm for translational movements and 0.1 degrees for rotational movements) to ensure precise positioning even in the presence of mechanical backlash or friction variations.

The processor 55 implements intelligent motion sequencing that prioritizes the most impactful positioning adjustments first, typically addressing major translational corrections before fine-tuning rotational alignment. This approach minimizes the time required to achieve optimal positioning while maintaining a natural progression of movements. The control system 40 also incorporates adaptive speed scaling that automatically adjusts movement velocities based on the magnitude of required corrections, using faster movements for large repositioning actions (up to 5 mm/second or 10 degrees/second) and slower, more precise movements for fine adjustments (0.5-1 mm/second or 1-2 degrees/second).

The measuring function (339) begins with precise identification of key anatomical landmarks within the filtered high-quality ultrasound images 65. The processor 55 executes a U-Net-based semantic segmentation model (15.3 million parameters) that has been trained on thousands of annotated ophthalmic ultrasound images to identify and delineate critical structures including the globe boundary, optic nerve trajectory, and optic nerve sheath margins. Following segmentation, the processor 55 implements an automated measurement protocol that follows standardized clinical guidelines for ONSD assessment. This protocol automatically identifies the posterior boundary of the globe and calculates a measurement line positioned exactly 3 mm posterior to this boundary, perpendicular to the optic nerve axis. Along this precise measurement line, the algorithm determines the distance between the outer hypoechoic bands representing the boundaries of the optic nerve sheath 70, calculating the ONSD with a precision of ±0.1 mm. To enhance measurement robustness, the processor 55 applies sub-pixel interpolation techniques that achieve measurement precision exceeding the nominal resolution limits of the ultrasound system.

For longitudinal monitoring applications, the processor 55 maintains a database of previous measurements for each patient, enabling automated calculation of changes from baseline and trend characteristics. The measurement algorithms incorporate compensation for technical factors that might influence ONSD values, such as variations in beam angle or subtle differences in measurement plane position, ensuring consistency across sequential examinations. All measurement data, including raw values, confidence intervals, and derived metrics such as change from baseline, are stored with timestamps and quality indicators to support retrospective analysis and integration with clinical documentation systems.

The processor 55 implements a multi-stage analytical pipeline that begins with comparison of measured ONSD values against normative reference ranges in the determining function (341). Rather than applying universal thresholds, the system 300 employs demographic-specific reference values derived from comprehensive databases stratified by age, sex, ethnicity, and other relevant factors. For adult users 25, the typical normative range is 4.0-5.8 mm with values above this range indicating potential ICP elevation, while pediatric ranges are specifically adjusted for age groups (neonates: 3.3-4.5 mm; children 1-10 years: 3.7-5.0 mm; adolescents: 3.8-5.5 mm).

The processor 55 may then execute a probabilistic classification model that transforms the raw ONSD value, demographic factors, and measurement quality metrics into a likelihood score ranging from 0-100%. This score represents the probability of significant intracranial hypertension (typically defined as ICP>20 mmHg) based on correlations established through validation studies comparing ONSD measurements with invasive ICP monitoring. The model incorporates not only the absolute ONSD value but also factors such as bilateral asymmetry (when available), measurement confidence, and patient-specific factors that might influence ONSD interpretation.

For users 25 with baseline measurements available from previous examinations, the processor 55 calculates percent change from baseline and applies change-based thresholds (typically flagging increases of >15% as potentially significant) that may detect evolving pathology even when absolute values remain within normal ranges. The determination algorithm also implements temporal trend analysis for continuous monitoring applications, applying time-series analysis techniques to identify significant changes over time that might indicate development or resolution of intracranial hypertension.

When additional physiological parameters are available from complementary measurements (such as pulsatility indices or ocular Doppler assessments), the processor 55 employs a multivariate Bayesian network model that integrates these diverse inputs to generate a more comprehensive assessment of intracranial pressure status. This integrated approach significantly enhances diagnostic specificity compared to ONSD measurement alone, particularly for borderline cases. All determination results, including raw likelihood scores, contributing factors, and confidence assessments, are logged with timestamps to create a comprehensive diagnostic record that supports clinical decision-making and documentation requirements.

In the generating function (343), the processor 55 implements a comprehensive data organization framework that ensures all relevant diagnostic and quality information is systematically captured, clearly presented, and appropriately documented. The generated output data encompasses multiple information categories structured in a hierarchical format that balances immediate clinical relevance with comprehensive documentation. For each examination session, the processor 55 generates primary diagnostic measurements including the mean ONSD value with precision to 0.1 mm, accompanied by statistical descriptors such as standard deviation, range, and number of qualifying measurements when multiple frames are analyzed. Each measurement is associated with a confidence score ranging from 0-100% that reflects both the quality of the underlying images 65 and the consistency of measurements across multiple frames or angles. These confidence metrics enable clinicians to appropriately weight diagnostic information in their clinical decision-making.

Quality assessment data includes comprehensive frame-level quality scores across multiple dimensions (signal-to-noise ratio, contrast, boundary definition, anatomical completeness, artifact presence) and aggregate quality metrics for the entire examination. This detailed quality documentation supports both immediate clinical interpretation and retrospective quality assurance activities. For each examination, the processor 55 also generates a standardized set of representative images, automatically selecting frames that best demonstrate key anatomical structures and measurement locations according to predefined clinical protocols.

The alert component of the output data implements a tiered notification system with urgency levels determined by both the absolute diagnostic values and their relationship to patient-specific thresholds. Critical alerts (typically triggered by ONSD values >6.0 mm or increases >20% from baseline) are formatted with high-visibility indicators and can trigger immediate notifications through the user interface 85, audio alerts via the speaker 95, or remote notifications to connected monitoring systems 93 depending on configuration settings.

The reinforcement learning algorithm implemented by the processor 55 utilizes a deep Q-network (DQN) architecture specifically designed for real-time optimization of ultrasound transducer 30 positioning. Unlike traditional supervised learning approaches that require extensive prelabeled datasets, the reinforcement learning system learns optimal control policies through continuous interaction with the environment, maximizing long-term rewards associated with high-quality image acquisition of the optic nerve sheath 70. The state space of the reinforcement learning model encompasses multiple dimensions of information: current transducer 30 position and orientation parameters (with millimeter-precision coordinates and sub-degree angular measurements), real-time image quality metrics (including contrast ratio, signal-to-noise ratio, and edge definition scores), and anatomical landmark detection confidence scores (quantifying the probability of correctly identified structures). The action space includes fine-grained adjustments to the six degrees of freedom controlled by the motorized control mechanism 40: three translational axes (superior-inferior, medial-lateral, anterior-posterior) with movement increments of 0.1-0.5 mm, and three rotational axes (pitch, yaw, roll) with angular increments of 0.5-2.0 degrees. The reward function is carefully designed to balance multiple objectives, incorporating image quality metrics (contrast, resolution, signal-to-noise ratio), anatomical landmark visibility (clarity of optic nerve sheath 70 boundaries), and measurement plane alignment (perpendicularity to the optic nerve axis). Higher rewards are assigned for optimal positioning that maximizes ONSD measurement accuracy and reliability, with the reward calculation employing a weighted combination that prioritizes anatomical landmark visibility (40%), measurement plane alignment (30%), and image quality metrics (30%).

As shown in FIG. 6B, implementing (333) the reinforcement learning algorithm may comprise filtering (345) ultrasound images 65 that fail to meet predetermined quality thresholds related to anatomical landmark visibility of the optic nerve sheath 70. The quality filtering framework utilizes a multi-stage pipeline that systematically evaluates each ultrasound frame against essential quality criteria before inclusion in the diagnostic analysis. The initial stage applies a convolutional neural network (CNN) designed to detect motion artifacts, acoustic shadowing, reverberation artifacts, and insufficient coupling that might compromise image integrity. Frames exhibiting significant artifacts are immediately filtered out before further processing. The second stage focuses specifically on anatomical landmark visibility, employing a segmentation-based approach to evaluate the clarity and completeness of critical structures. For each frame, the algorithm quantifies visibility scores for key landmarks including the globe boundary, optic nerve entry point, optic nerve trajectory, and optic nerve sheath boundaries. These visibility scores are compared against predetermined thresholds derived from extensive clinical validation studies. The thresholds are dynamically adjusted based on patient-specific factors and imaging conditions to balance sensitivity and specificity. In addition to binary filtering decisions, the system 300 assigns continuously-valued quality scores to retained frames, enabling ranking and prioritization when multiple frames meet minimum quality requirements. This nuanced approach ensures that only frames with clear visualization of the optic nerve sheath 70 and surrounding structures proceed to measurement and analysis, significantly reducing measurement variability and enhancing diagnostic reliability. The quality thresholds are implemented with appropriate hysteresis to prevent oscillatory behavior in borderline cases, and the filtering decisions incorporate contextual information from temporal sequences to maintain consistency across monitoring sessions.

As also shown in FIG. 6B, the computer-executable instructions 320 comprise may comprise tracking (347) temporal changes in ONSD measurements over time to detect trends indicative of changing intracranial pressure. The temporal tracking process integrates sophisticated time-series analysis techniques with clinical knowledge of ICP dynamics to extract meaningful patterns from sequential ONSD measurements. The system 300 utilizes multiple temporal analysis methods operating at different time scales to capture both rapid fluctuations and gradual trends. At the shortest time scale (minutes to hours), the algorithm applies adaptive smoothing techniques that reduce random measurement variability while preserving clinically significant changes. This approach utilizes Kalman filtering with dynamic noise estimation to distinguish between measurement noise and true physiological changes. At intermediate time scales (hours to days), the system implements change-point detection algorithms to identify statistically significant shifts in baseline ONSD values that may indicate clinical deterioration or improvement. These algorithms incorporate both parametric and non-parametric statistical methods, adapting to the specific characteristics of each patient's data pattern. For long-term monitoring (days to weeks), the system 300 applies trend analysis that characterizes the rate and pattern of ONSD changes, distinguishing between linear, exponential, and oscillatory patterns that may have different clinical implications. The temporal tracking process calculates derived metrics including rate-of-change, variability indices, and pattern classifications that provide additional diagnostic insights beyond absolute ONSD values. All temporal analyses incorporate confidence intervals that reflect both measurement uncertainty and physiological variability, ensuring that clinicians can appropriately interpret the significance of observed changes. Additionally, the system 300 enables annotation of external events (medication administration, clinical interventions, patient position changes) that may influence ONSD measurements, facilitating correlation between treatments and observed changes in ICP indicators.

As also shown in FIG. 6B, the computer-executable instructions 320 may comprise cross-validating (349) ONSD measurements with supplementary diagnostic parameters including pulsatility indices and vascular flow metrics to enhance diagnostic reliability. The cross-validation framework integrates multiple physiological parameters derived from the same ultrasound data to provide a more comprehensive and robust assessment of intracranial pressure status. Beyond static ONSD measurements, the system 300 analyzes pulsatility characteristics of the optic nerve sheath, quantifying subtle diameter variations synchronized with cardiac cycles. These pulsations typically increase with elevated ICP due to the transmission of intracranial pressure waves through the cerebrospinal fluid. The pulsatility index is calculated as the ratio of the maximum variation in ONSD to the mean ONSD value, with elevated ratios (>5%) suggesting increased ICP. Vascular flow metrics are derived from Doppler analysis of orbital vessels, particularly the central retinal artery and vein. The system 300 measures parameters including peak systolic velocity, end-diastolic velocity, resistivity index, and flow acceleration time. Elevated ICP typically manifests as increased vascular resistance and altered flow patterns, with resistivity indices above 0.75 in the central retinal artery suggesting elevated downstream pressure. The cross-validation algorithm utilizes a multivariate statistical model that integrates these diverse parameters, weighting each according to signal quality and reliability metrics. This integrated approach significantly enhances diagnostic accuracy compared to ONSD measurements alone, particularly in cases where anatomical variations or imaging limitations might compromise a single parameter. The system 300 generates a composite ICP probability score that synthesizes all available information, providing clinicians with a more comprehensive assessment of intracranial pressure status than would be possible with any individual measurement.

As also shown in FIG. 6B, the computer-executable instructions 320 may comprise automatically switching (351) between continuous and intermittent monitoring modes 165 based on detected changes in ONSD measurements that exceed predefined variability thresholds. The adaptive monitoring system optimizes resource utilization while ensuring appropriate surveillance intensity based on the patient's clinical status. The system continuously analyzes measurement stability and trends to make intelligent decisions about monitoring frequency. When ONSD measurements remain stable within normal parameters (typically below 5.0 mm with less than 0.3 mm variation between consecutive measurements), the system 300 automatically transitions to intermittent monitoring mode, reducing power consumption and minimizing unnecessary data acquisition. In this mode, measurements are taken at clinician-defined intervals (typically 15-60 minutes apart) while the system 300 maintains background environmental monitoring and periodic self-diagnostics. If any single measurement exceeds the upper threshold for normal ONSD values (typically >5.8 mm, adjustable based on patient-specific factors), the system immediately switches to continuous monitoring mode, acquiring images at frequent intervals (typically every 1-5 minutes) to closely track potential ICP elevation. Similarly, if the system 300 detects significant measurement variability exceeding predefined thresholds (typically >0.4 mm change between consecutive measurements), it triggers a transition to continuous monitoring to determine whether the variability represents a clinically significant trend or measurement artifact. The decision algorithm incorporates hysteresis parameters to prevent oscillatory switching between modes in borderline cases, requiring sustained normalization before reverting from continuous to intermittent monitoring. Additionally, the system 300 includes override capabilities allowing clinicians to manually select the appropriate monitoring mode based on clinical judgment. This adaptive approach ensures comprehensive monitoring during critical periods while conserving battery life and computational resources during periods of stability, making the system 300 particularly valuable for extended deployments in resource-constrained environments.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory may utilized during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
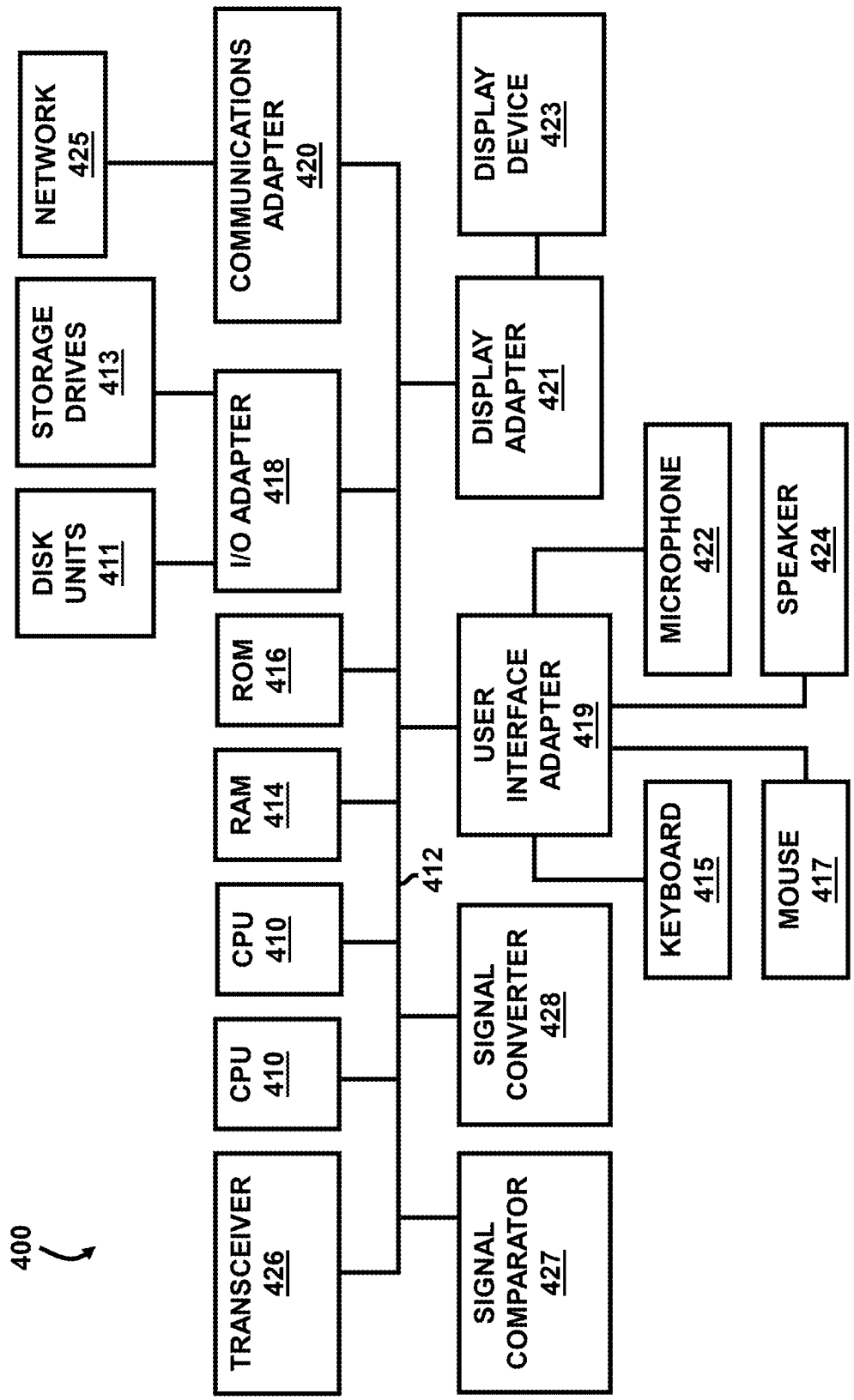
FIG. 7 is a block diagram illustrating a computer system used in accordance with the embodiments herein.

A representative hardware environment for practicing the embodiments herein is depicted in FIG. 7, with reference to FIGS. 1A through 6B. This schematic drawing illustrates a hardware configuration of an information handling/computer system 400 in accordance with the embodiments herein. The system 400 comprises at least one processor or central processing unit (CPU) 410. The CPUs 410 are interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system 400 can read the inventive instructions on the program storage devices and follow these instructions to execute the methodology of the embodiments herein. The system 400 further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example. Further, a transceiver 426, a signal comparator 427, and a signal converter 428 may be connected with the bus 412 for processing, transmission, receipt, comparison, and conversion of electric or electronic signals.

Figure 8:
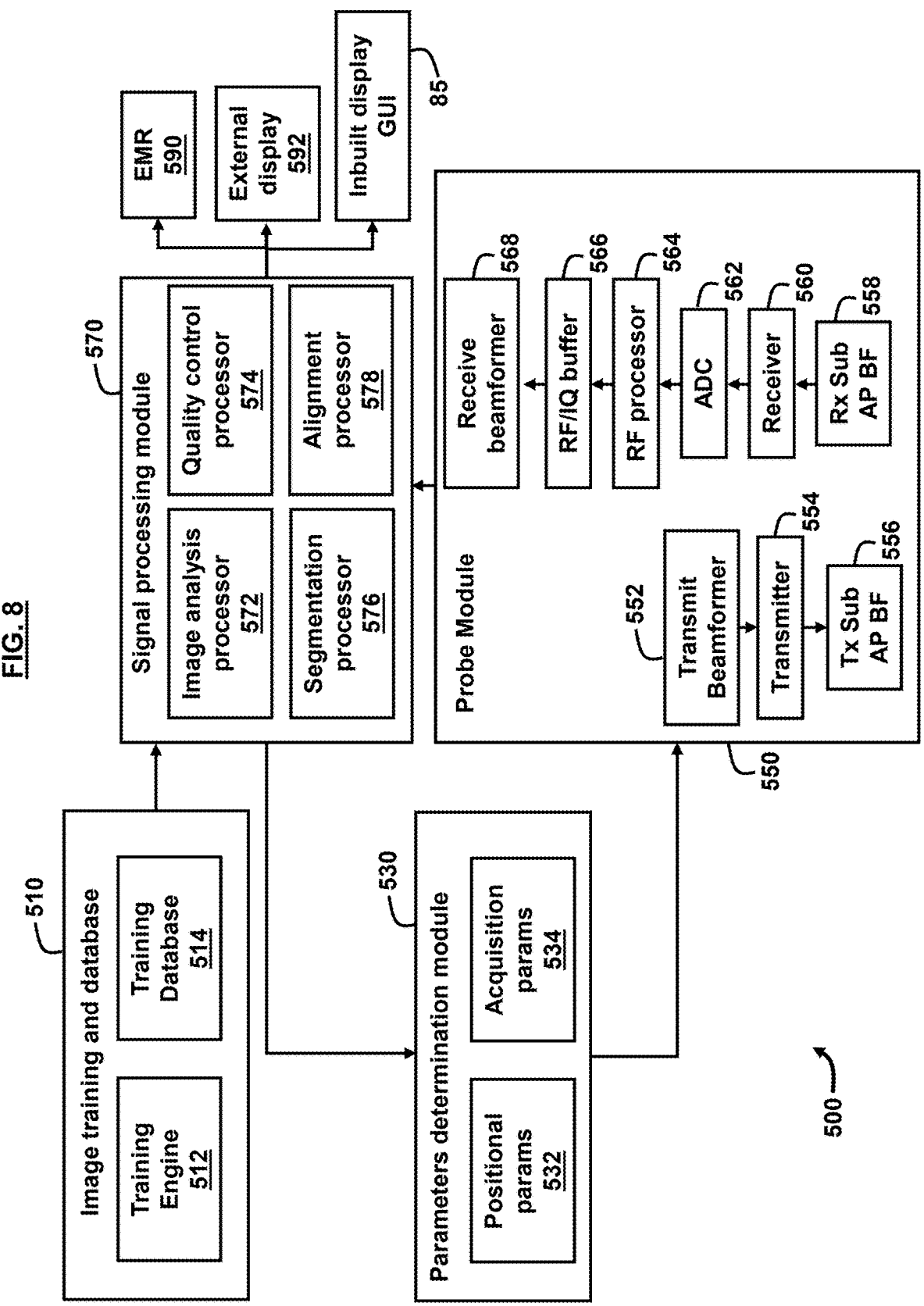
FIG. 8 is a schematic block diagram illustrating a system architecture for the wearable device for non-invasive monitoring of intracranial pressure, according to an embodiment herein.

FIG. 8, with reference to FIGS. 1A through 7, illustrates a schematic block diagram of the system architecture for the wearable device 10 for non-invasive monitoring of intracranial pressure, according to an embodiment herein. The system architecture 500 includes an image training and database module 510, a parameters determination module 530, a probe module 550, and a signal processing module 570. The image training and database module 510 comprises a training engine 512 and a training database 514 that store and process the extensive datasets used to train the system's artificial intelligence algorithms. The parameters determination module 530 includes positional parameters component 532 and acquisition parameters component 534, which work together to optimize the positioning of the transducer 30 and ultrasound imaging settings. The probe module 550 incorporates a transmit beamformer 552 that receives input from the parameters determination module 530, a transmitter 554, and a transmit sub-aperture beamformer 556 on the transmission side. The reception components of the probe module 550 include a receive sub-aperture beamformer 558, a receiver 560, an analog-to-digital converter (ADC) 562, an RF processor 564, an RF/IQ buffer 566, and a receive beamformer 568. The signal processing module 570 processes the acquired ultrasound data and comprises an image analysis processor 572, a quality control processor 574, a segmentation processor 576, and an alignment processor 578. The processed data can be transmitted to an electronic medical record (EMR) system 590, displayed on an external display 592, or shown on the inbuilt GUI 85 of the device 10. The system architecture 500 enables the reinforcement learning-based control system to dynamically adjust the ultrasound transducer position while optimizing image acquisition, quality control, and diagnostic interpretation for accurate ONSD measurement, even in austere environments or during patient transport.

The training engine 512 implements deep learning algorithms to process and learn from thousands of annotated ophthalmic ultrasound images, enabling the system 500 to identify optimal diagnostic frames and accurately measure ONSD. The training database 514 stores a diverse dataset of ultrasound images representing various pathological states, patient demographics, and image quality conditions, providing the foundation for the AI model's development. The positional parameters component 532 utilizes the reinforcement learning algorithms to determine the optimal six degrees of freedom adjustments for the motorized control mechanism, ensuring precise transducer placement. The acquisition parameters component 534 implements the artificial intelligence algorithms that dynamically adjust imaging parameters including gain, depth, frequency, and focus based on the specific anatomical characteristics of the user.

Within the probe module 550, the transmit beamformer 552 generates precisely timed excitation pulses with specific amplitude, frequency, and phase characteristics tailored to ophthalmic tissues. The transmitter 554 amplifies these signals before they are sent to the transducer elements. The transmit sub-aperture beamformer 556 enables selective activation of specific elements within the 32-256 element array based on the desired imaging depth and field of view. On the reception side, the receive sub-aperture beamformer 558 collects the returning echoes from the optic nerve sheath 70. The receiver 560 amplifies these weak signals, which are then digitized by the ADC 562 for further processing. The RF processor 564 performs initial signal conditioning, and the RF/IQ buffer 566 temporarily stores this data before it reaches the receive beamformer 568, which integrates the signals from multiple channels to form coherent image data.

In the signal processing module 570, which may be part of the processor 55, the image analysis processor 572 executes the deep learning-based object keypoint similarity (OKS) algorithms to identify optimal diagnostic frames and measure the ONSD at the predefined depth behind the globe of the eye 35. The quality control processor 574 evaluates each acquired ultrasound image against multiple quality criteria, automatically filtering out frames with artifacts, low contrast, or suboptimal alignment. The segmentation processor 576 implements the U-Net-based semantic segmentation model to identify and delineate critical structures including the globe boundary, optic nerve trajectory, and optic nerve sheath margins. The alignment processor 578 ensures that measurements are taken at precisely the standardized location of 3 mm behind the globe, perpendicular to the optic nerve axis. Together, these components enable the wearable device to achieve high-precision, automated ONSD measurements with significantly reduced operator dependency, making it suitable for use in diverse clinical and austere environments.

Figure 9:
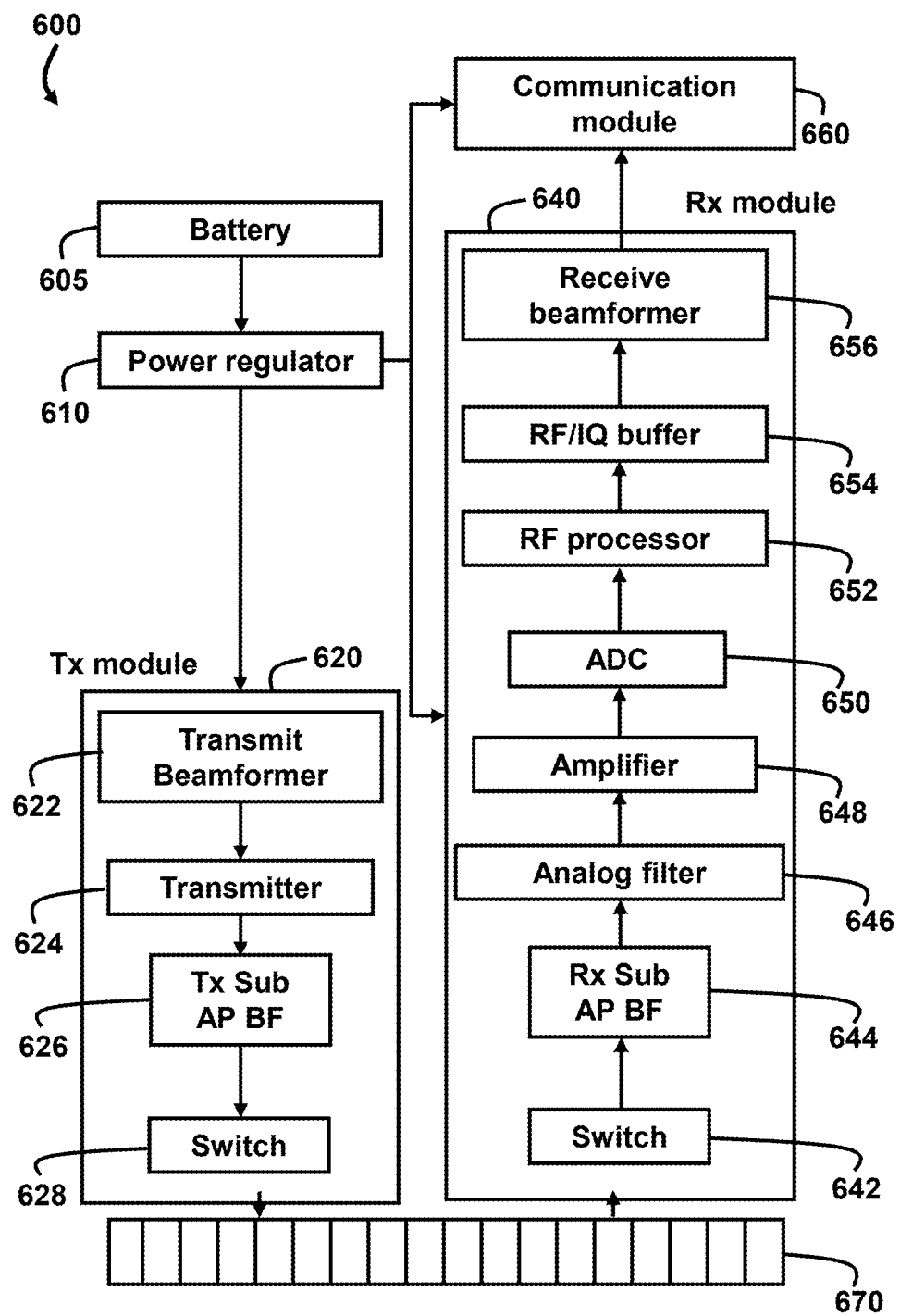
FIG. 9 is a detailed block diagram illustrating the power and signal processing architecture of the wearable device for non-invasive monitoring of intracranial pressure, according to an embodiment herein.

FIG. 9, with reference to FIGS. 1 through 8, illustrates a detailed block diagram of the power and signal processing architecture 600 of the wearable device 10 for non-invasive monitoring of intracranial pressure, according to an embodiment herein. The architecture 600 comprises a power subsystem including a battery 605 operatively connected to a power regulator 610 that delivers regulated power to all active components of the device 10. The signal processing architecture includes a transmit (Tx) module 620 and a receive (Rx) module 640 that work in concert to generate ultrasound signals and process the returning echoes, respectively. The Tx module 620 comprises a transmit beamformer 622 that controls the timing and amplitude of excitation pulses, a transmitter 624 that amplifies these signals, a Tx sub-aperture beamformer 626 that manages activation patterns of transducer elements, and a switch 628 that routes signals to the appropriate transducer elements in the array. The Rx module 640 includes a receive switch 642 that selects signals from active transducer elements, an Rx sub-aperture beamformer 644 that performs initial signal combining, an analog filter 646 for noise reduction, an amplifier 648 that enhances signal strength, an analog-to-digital converter (ADC) 650 that digitizes the analog signals, an RF processor 652 for signal conditioning, an RF/IQ buffer 654 for temporary signal storage, and a receive beamformer 656 that performs spatial processing to form coherent ultrasound images. The system architecture 600 further includes a communication module 660 with Bluetooth® Low Energy (BLE) and Wi-Fi® capabilities that receives processed data from the Rx module 640 and enables wireless transmission of diagnostic information to the remote monitoring system 93. Additionally, an array of transducer elements 670 is provided, corresponding to the at least one ultrasound transducer 30. The integrated architecture 600 enables the sophisticated signal processing required for the reinforcement learning-based control system 60 to dynamically adjust transducer positioning while maintaining optimal acoustic coupling, even in austere environments or during patient transport.

The battery 605 may be implemented as the lithium-iron-phosphate ($LiFePO_4$) system described in the power management module 150, providing 7.2V nominal voltage with 3200 mAh capacity. The power regulator 610 implements the hierarchical power allocation system of the power management module 150, which dynamically prioritizes system components according to their functional necessity and power consumption profiles. The Tx module 620 coordinates with the AI algorithm 110 to dynamically adjust imaging parameters including gain, depth, frequency, and focus. The transmit beamformer 622 generates precisely timed excitation pulses with specific amplitude, frequency, and phase characteristics tailored to the acoustic properties of ocular tissues, digitally synthesized with optimal waveform characteristics for penetrating the eyelid and visualizing the optic nerve sheath 70. The transmitter 624 amplifies these signals to appropriate power levels while maintaining patient safety, while the Tx sub-aperture beamformer 626 enables the selective activation of specific elements within the 32-256 element array described previously, based on the desired imaging depth and field of view. The switch 628 provides the high-speed routing necessary for electronic beam steering that enables the multi-plane scanning capabilities described in the scanning protocol.

In the Rx module 640, the receive switch 642 works in coordination with the Tx switch 628 to implement the dynamic aperture control strategy, where a narrow aperture is used for transmission followed by an expanded aperture for reception to maximize sensitivity. The Rx sub-aperture beamformer 644 performs initial signal combining from groups of transducer elements, while the analog filter 646 implements band-pass filtering optimized for the 8-12 MHz frequency range used in ophthalmic imaging. The amplifier 648 provides variable gain amplification controlled by the processor 55 to optimize signal levels across different tissue depths and patient anatomies. The ADC 650 digitizes the signals with 12-bit amplitude resolution to preserve the subtle tissue contrast necessary for accurate ONSD measurement. The RF processor 652 implements the time-gain compensation to account for depth-dependent attenuation, and the specialized edge enhancement algorithms that improve boundary definition for the optic nerve sheath 70. The RF/IQ buffer 654 temporarily stores processed data before it reaches the receive beamformer 656, which integrates signals from multiple channels to form coherent image data using the adaptive focusing algorithms that dynamically adjust focal zone positions. The communication module 660 supports the multi-tier communication architecture described previously, enabling secure, encrypted transmission of diagnostic information to the remote monitoring system 93 via either Bluetooth® Low Energy for short-range device-to-device transmission or Wi-Fi® for hospital network integration. The integrated architecture enables continuous optimization of imaging parameters and transducer positioning through the reinforcement learning-based control system 60, ensuring consistent, high-quality ONSD measurements even in dynamic or resource-constrained environments.

FIG. 10, with reference to FIGS. 1 through 9, illustrates a flowchart of the operational workflow for the wearable device 10 for non-invasive monitoring of intracranial pressure, according to an embodiment herein. The workflow begins with securing the device 10 over the eyes 35 of a user 25 (step 700), corresponding to the securing step (205) described previously, where the wearable structure 15 is positioned with the transducer 30 housing aligned with the superior orbital rim of the user 25. Once properly positioned, the micropump 125 is activated to fill the wearable structure 15 (e.g., goggle) cavity 135 (step 710), dispensing the specially formulated ultrasound gel 120 from the fluid reservoir 115 through microfluidic channels at the precisely controlled flow rate of 0.8-1.2 ml/minute. The fluid level sensor 140 continuously monitors the fluid volume, and when triggered (decision point 720), signals the processor 55 to stop the micropump 125 (step 730), indicating that the optimal fill level of approximately 70-80% cavity capacity has been reached. The motorized control mechanism 40 then positions the transducer 30 for the desired scan (step 740) by systematically varying the transducer position across all six degrees of freedom as described in the reinforcement learning-based control system 60. The embodiments herein verify acceptable position and confirms that strain gauge measured pressure remains below the predefined safety threshold (decision point 750) to prevent excessive pressure on the eye 35. Once optimal positioning is confirmed, the embodiments herein acquire data by moving the transducer 30 (step 760) in the multi-plane scanning protocol that captures both superior-inferior and midline-lateral aspects of the optic nerve sheath 70. The real-time quality assessment algorithms continuously evaluate image characteristics (decision point 770), triggering automatic repositioning if quality metrics fall below predetermined thresholds. For images meeting quality standards, the embodiments herein identify frames with acceptable optic nerve sheath visualization (step 780) using the deep learning-based object keypoint similarity (OKS) algorithm. The segmentation processor 576 then segments the optic nerve sheath and vitreous structures (step 790) using the U-Net-based semantic segmentation model. Subsequently, the system 300 estimates the optic nerve sheath diameter for each qualified frame (step 800) at the standardized location of 3 mm posterior to the globe, and outputs these measurements as diagnostic values (output 810). Based on these measurements, the system computes the diagnostic decision (step 820) by comparing the measured ONSD against individualized threshold values derived from the comprehensive normative databases, producing a likelihood score for elevated intracranial pressure (output 830). Finally, the bidirectional capability of the pump 125 activates to pump liquid from the cavity 135 back into the reservoir 115 (step 840), completing the examination cycle.

The securing process (step 700) ensures the optimal positioning and stability of the device 10. The ergonomic design with contoured edges of the wearable structure 15 conforms to various facial anatomies, while the adjustable elastic straps with quick-release mechanisms distribute pressure evenly around the cranial circumference. The activation of the micropump 125 (step 710) leverages the precision microfluidic architecture of the fluid management system 45, where the medical-grade ultrasound gel 120 with its controlled viscosity (5000-8000 centipoise) and acoustic impedance (approximately 1.63 MRayl) is delivered at body temperature (35-37° C.) through the integrated warming element. The water sensor triggering decision point (720) utilizes the non-contact capacitive sensing technology of the fluid level sensor 140 with its measurement resolution of ±0.05 ml taking readings at 10 Hz. The transducer positioning step (740) implements the mechatronic system of the motorized control mechanism 40 with its miniaturized high-precision brushless DC motors and optical encoders achieving positioning accuracy of ±0.1 mm and ±0.5 degrees.

The acceptable position verification (decision point 750) incorporates micro-limit switches and torque sensing to prevent excessive pressure on the eye 35, while the data acquisition process (step 760) utilizes the 1D phased array configuration of the transducer 30 with its electronic beam steering capabilities. The image quality assessment (decision point 770) executes the convolutional neural network that evaluates quality factors including boundary definition clarity, anatomical landmark visibility, measurement plane alignment, and freedom from artifacts. The frame identification step (780) implements the OKS algorithm that mathematically quantifies the similarity between identified keypoints and the ideal reference model of optic nerve sheath anatomy using Equation (1). The segmentation process (step 790) employs the hybrid neural network architecture with the ResNet backbone for feature extraction, followed by parallel branches for segmentation and keypoint detection tasks. The ONSD estimation (step 800) utilizes the sub-pixel interpolation techniques that achieve measurement precision of approximately 0.1 mm, while the diagnostic decision computation (step 820) implements the probabilistic model that transforms the absolute ONSD value into a likelihood score ranging from 0-100%, representing the probability of elevated intracranial pressure. The liquid removal step (840) activates the bidirectional capability of the micropump 125 to remove the coupling medium from the cavity 135, preparing the device for either storage or the next examination cycle.

FIG. 11, with reference to FIGS. 1 through 10, illustrates a flowchart of the reinforcement learning-based control system 60 for optimizing ultrasound transducer placement in the wearable device 10, according to an embodiment herein. The process begins at the start point 900 and immediately gathers input from three parallel sources: current probe position 910, ultrasound image input 920, and wide-angle camera input 930. The current probe position 910 data includes precise coordinates and angulation parameters of the ultrasound transducer 30 from the optical encoders in the motorized control mechanism 40. The ultrasound image input 920 provides real-time B-mode representations of ocular anatomy captured at frame rates of 15-30 Hz as described above. The wide-angle camera input 930 delivers real-time visualization from the miniaturized digital imaging system 80 with its 120° field of view. These multiple input streams are integrated into a comprehensive state representation 940 that encompasses the current transducer 30 position and orientation parameters, real-time image quality metrics including contrast ratio and signal-to-noise ratio, and anatomical landmark detection confidence scores for the optic nerve sheath boundaries. Based on this state representation, the reinforcement learning algorithm performs action selection 950 to determine optimal adjustments for the probe in terms of rotation, tilt, and translation across the six degrees of freedom described above. The system then executes the selected adjustments and captures a new ultrasound image 960 using the motorized control mechanism 40 with its positioning accuracy of ±0.1 mm and ±0.5 degrees. For each captured image, the system calculates a quality score 970 using the reward function, which evaluates image quality metrics, anatomical landmark visibility, and measurement plane alignment. This quality score 975 is recorded for system performance evaluation. At decision point 980, the system determines whether the selected view is appropriate based on predetermined quality thresholds described above. If the quality criteria are not met, the system initiates control feedback 990, which returns the process to the state representation 940 for another iteration of adjustments. If the quality criteria are satisfied, the system proceeds to perform complete data acquisition 995 of the optic nerve sheath images 65 using the protocols described above. The process then terminates at the end point 999, with the optimal transducer position established for accurate ONSD measurement.

The current probe position input 910 incorporates data from the six degrees of freedom provided by the motorized control mechanism 40, including three translational axes (x, y, z) with millimeter-precision coordinates and three rotational axes (pitch, yaw, roll) with sub-degree angular measurements. This position data is captured through the integrated optical encoders that achieve positioning accuracy of ±0.1 mm and ±0.5 degrees. The ultrasound image input 920 comprises the high-resolution B-mode representations described above, with 8-bit grayscale depth (256 intensity levels) and real-time processing including speckle reduction filtering, edge enhancement, and contrast optimization specifically tuned for ophthalmic applications. The wide-angle camera input 930 leverages the miniaturized digital imaging system described above, providing contextual information about transducer positioning relative to orbital anatomy.

The state representation 940 creates a comprehensive multi-dimensional state space as described above, integrating position parameters, image quality metrics, and anatomical landmark detection confidence scores into a unified representation that serves as input to the deep Q-network architecture. The action selection process 950 implements the fine-grained adjustments described above, with movement increments of 0.1-0.5 mm for translational axes and 0.5-2.0 degrees for rotational axes. The adjustment and image capture step 960 utilizes the closed-loop feedback mechanisms described above, where optical encoder data from each motor ensures precise positioning even in the presence of mechanical backlash or friction variations. The quality score calculation 970 employs the weighted combination approach described above, which prioritizes anatomical landmark visibility (40% of total reward), measurement plane alignment (30%), and image quality metrics (30%). The "selected view appropriate" decision point 980 implements the multi-stage quality filtering framework described above, which systematically evaluates each ultrasound frame against essential quality criteria before inclusion in the diagnostic analysis. The control feedback loop 990 enables the exploration-exploitation strategy described above, where the system initially favors broad position sampling before progressively focusing on regions yielding higher-quality images. Finally, the data acquisition step 995 executes the comprehensive imaging protocol described above, capturing multiple imaging planes and both single high-resolution frames and short cine loops to provide complete visualization of the optic nerve sheath 70 for accurate ONSD measurement.

Figure 12:
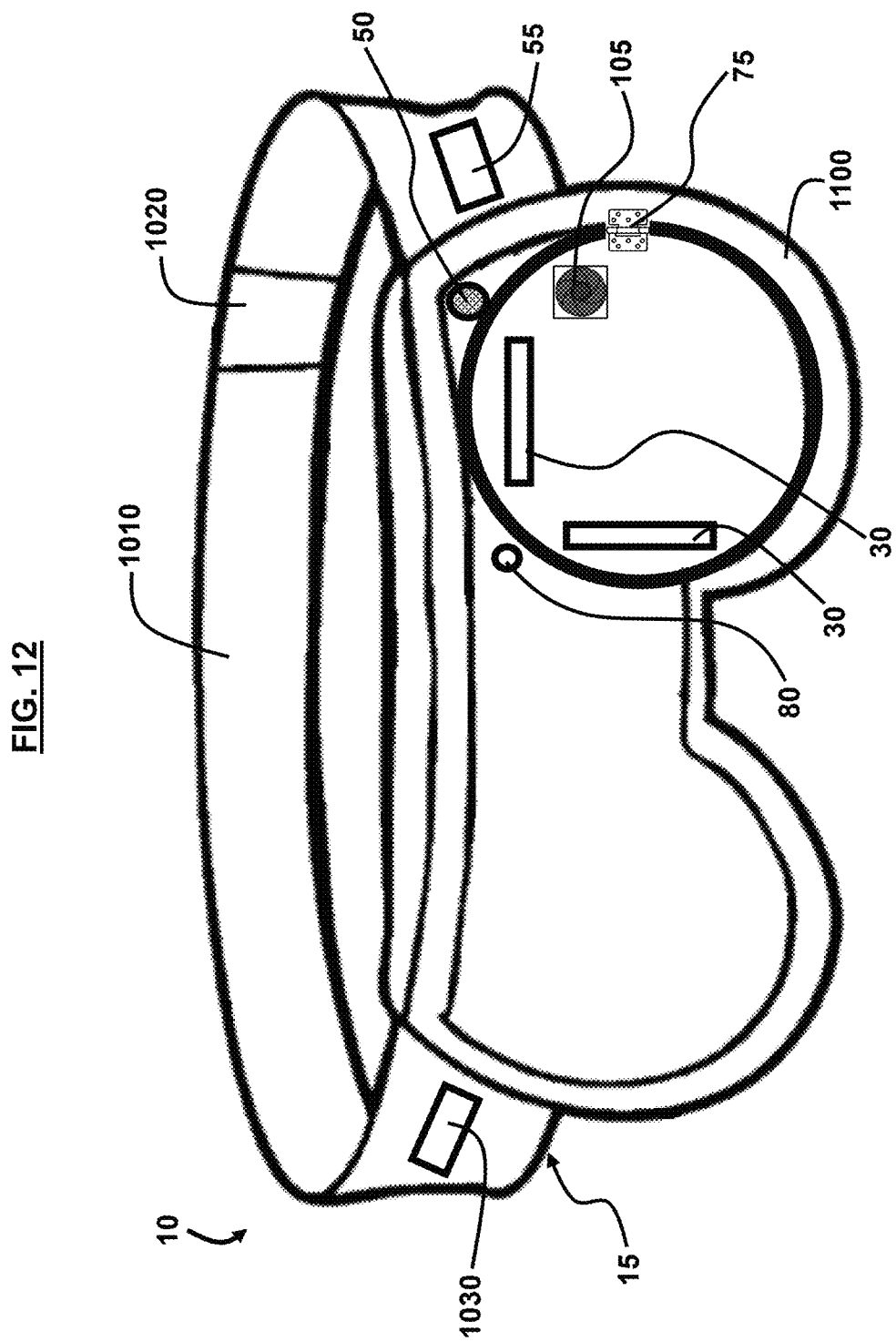
FIG. 12 is a schematic diagram illustrating the wearable structure of the wearable device for non-invasive monitoring of intracranial pressure, according to an embodiment herein.

FIG. 12, with reference to FIGS. 1 through 11, illustrates a schematic diagram of the wearable structure 15 of the wearable device 10 for non-invasive monitoring of intracranial pressure, according to an embodiment herein. In this embodiment, the wearable structure 15 is configured as a goggle-like apparatus with an elastic band 1010 that wraps around the head 20 of the user 25 and includes an adjustable clamp 1020 that enables precise tension adjustment for optimal fit across different head sizes. The wearable structure 15 incorporates an air vent 50 at its superior aspect, corresponding to the integrated air vent system 50, which facilitates pressure equalization without compromising the seal around the eyes 35. The micropump and reservoir 1030 are positioned at the lateral aspect of the device 10, housing the fluid reservoir 115 with its 10-15 ml capacity and the precision piezoelectric micropump 125. The processor 55 implements the reinforcement learning-based control system 60 and other computational components. At the front of the device 10, an optical sensor is positioned above the eye 35, corresponding to the wide-angle camera 80, with its 120° field of view for real-time anatomical visualization. The ultrasound transducer 30 is positioned centrally in the goggle cavity. Adjacent to the transducer 30 is the fish-eye lens 105 that provides a wide field of vision when the user 25 needs visual access without removing the device 10. The lens 105 is attached to a hinge 75, allowing selective opening and closing for temporary vision access. The entire goggle perimeter is sealed with a watertight flap 1100 made of soft, medical-grade silicone material that conforms to facial contours, creating the sealed cavity 135 needed for the acoustic coupling medium.

The elastic band 1010 implements the adjustable elastic straps, made from a combination of elastomeric materials and medical-grade textiles that distribute pressure evenly around the cranial circumference while wicking moisture away from contact points. The band 1010 features hypoallergenic materials with antimicrobial properties to maintain hygiene during extended wear periods. The adjustable clamp 1020 utilizes a quick-release mechanism that allows for rapid donning and doffing in emergency situations while maintaining precise tension control for optimal stability. The air vent 50 incorporates the selectively permeable hydrophobic expanded polytetrafluoroethylene (ePTFE) membrane with 0.2-micron pore size, providing bacterial filtration efficiency exceeding 99.9% while maintaining controlled airflow for pressure equalization and condensation prevention. The micropump and reservoir 1030 houses the precision microfluidic architecture of the fluid management system 45, including the medical-grade fluid reservoir 115 containing specially formulated ultrasound gel 120 with controlled viscosity (5000-8000 centipoise) and the bidirectional piezoelectric micropump 125 capable of delivering fluid volumes as small as 0.1 ml per activation.

Figure 13:
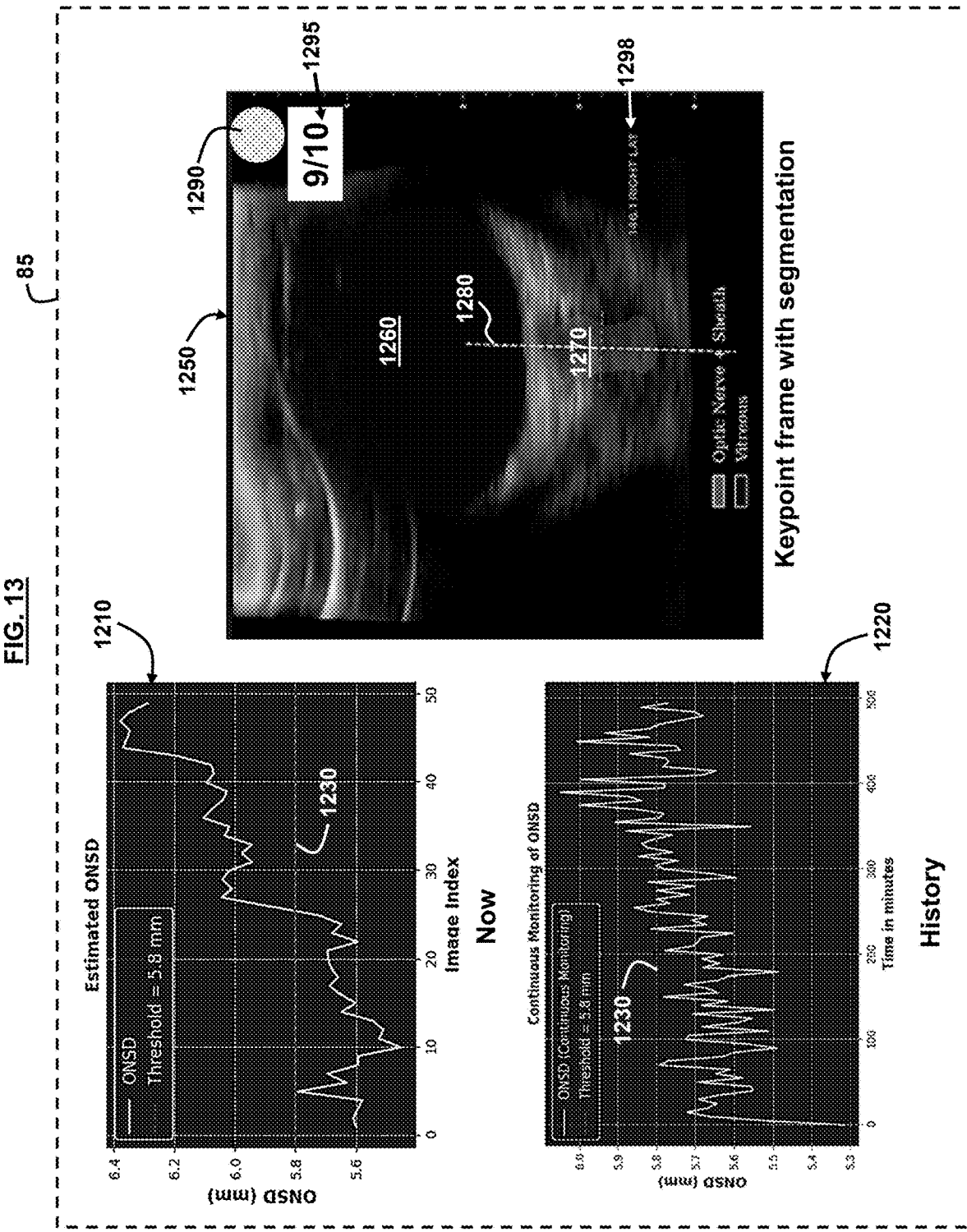
FIG. 13 is a diagram illustrating the graphical user interface display of the wearable device for non-invasive monitoring of intracranial pressure, according to an embodiment herein.

FIG. 13, with reference to FIGS. 1 through 12, illustrates the graphical user interface 85 display of the wearable device 10 for non-invasive monitoring of intracranial pressure, according to an embodiment herein. The interface 85 may be organized into multiple information panels 1210, 1220, 1250 that provide comprehensive diagnostic visualization for clinical decision-making. For example, there may be a section that includes two temporal trend displays: an "Estimated ONSD Now" panel 1210 showing recent real-time measurements with the current ONSD value plotted against image index, and a "History" panel 1220 displaying the "Continuous Monitoring of ONSD" over an extended timeframe with ONSD values plotted against time in minutes. Both panels 1210, 1220 include a horizontal threshold line 1230, 1240 at 5.8 mm, corresponding to the typical threshold for elevated intracranial pressure. Another section displays a "Keypoint frame with segmentation" panel 1250 showing the optimal diagnostic ultrasound frame selected by the deep learning-based object keypoint similarity (OKS) algorithm. This panel 1250 features automated segmentation of anatomical structures, with the vitreous humor highlighted in area 1260 and the optic nerve sheath highlighted in area 1270, corresponding to the segmentation processor 576 functionality described above. A vertical dotted measurement line 1280 indicates the standardized location at 3 mm behind the globe where the ONSD measurement is taken. Another section includes a "Quality indicator" 1290 with a color-coded circular visual cue and a numerical "Quality score" 1295 of "9/10", for example, representing the composite quality score ranging from 0-100, translated to a more user-friendly scale. The panel 1250 also includes a "Loaded ultrasound video" indicator 1298, signifying that the system is displaying a frame from a cine loop sequence as described above. This comprehensive interface 85 implements the multi-tiered information hierarchy described above, balancing immediate actionability with detailed diagnostic information to support rapid clinical assessment in diverse environments, from emergency settings to neurointensive care units.

The "Estimated ONSD Now" panel 1210 implements the trend visualization components described above, displaying ONSD values over a short timeframe with high temporal resolution to highlight immediate changes. The trace line in panel 1210 represents the real-time ONSD measurements with sub-millimeter precision (±0.1 mm). The "History" panel 1220 provides the longer-term visualization capability described above, enabling clinicians to identify trends and patterns over extended monitoring periods, crucial for tracking the evolution of intracranial pressure dynamics in conditions such as traumatic brain injury or hydrocephalus. The threshold line 1230, 1240 represents the personalized threshold calculation described above, which adjusts reference ranges based on patient demographics including age, sex, race/ethnicity, and body mass index. In both panels 1210, 1220, ONSD values above this threshold (shown crossing the threshold in the "Now" panel 1210) indicate possible elevated intracranial pressure requiring clinical attention.

The "Keypoint frame with segmentation" panel 1250 implements the advanced image analysis capabilities described above. The displayed frame has been automatically selected as having the highest OKS score, representing optimal alignment for accurate ONSD measurement. The vitreous segmentation 1260 and optic nerve sheath segmentation 1270 are generated by the U-Net-based semantic segmentation model described above, which has been trained on thousands of annotated ophthalmic ultrasound images to identify and delineate these critical structures. The measurement line 1280 precisely indicates the standardized location for ONSD assessment at exactly 3 mm posterior to the globe along the axis of the optic nerve, consistent with established clinical protocols described above. The "Quality indicator" 1290 and "Quality score" 1295 represent the confidence metrics described above, reflecting both the quality of the underlying images and the reliability of measurements, enabling clinicians to appropriately weight diagnostic information in their decision-making. The interface 85 as a whole exemplifies the customizable diagnostic views 160 described above, allowing clinicians to prioritize specific information relevant to their clinical workflow while maintaining comprehensive diagnostic visualization.

The wearable device 10 for non-invasive monitoring of intracranial pressure represents a significant advancement over existing technologies by integrating dynamic transducer positioning, AI-driven image optimization, and automated diagnostic capabilities into a wearable platform suitable for diverse clinical environments. The combination of the motorized control mechanism 40, reinforcement learning-based control system 60, and fluid management system 45, among other unique features, addresses the fundamental challenges of operator dependency, anatomical variability, and measurement reproducibility that have limited previous ultrasound-based ICP monitoring approaches. By automating critical aspects of image acquisition, quality assessment, and diagnostic interpretation, the device 10 extends access to sophisticated neurological monitoring beyond specialized neurocritical care units to emergency departments, field hospitals, combat zones, and austere environments where invasive monitoring is impractical or unfeasible. The dual operational modes 165, customizable diagnostic views 160, and wireless transmission capabilities further enhance the utility of the device 10 across diverse clinical scenarios, from continuous monitoring in intensive care settings to intermittent assessment during patient transport or in resource-constrained environments. This comprehensive approach to non-invasive ICP monitoring has the potential to significantly improve outcomes for patients with traumatic brain injuries, strokes, and other neurological conditions requiring vigilant pressure management, particularly in settings where traditional invasive monitoring techniques cannot be implemented.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed utilized herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A wearable device for non-invasive monitoring of intracranial pressure (ICP), comprising:
    a wearable structure configured to be secured to a head of a user;

at least one ultrasound transducer integrated within the wearable structure and configured to be positioned to align with an eye of the user when worn;

a motorized control mechanism with six degrees of freedom that is configured to dynamically adjust a position and angulation of the at least one ultrasound transducer;

a fluid management system that is configured to maintain an acoustic coupling between the at least one ultrasound transducer and the eye of the user;

an integrated air vent system that is configured to regulate pressure, prevent condensation, and maintain imaging quality within the wearable structure;

a processor coupled to the ultrasound transducer, wherein the processor is configured to:
  employ a reinforcement learning-based control system for optimizing transducer placement;
  acquire ultrasound images of an optic nerve sheath;
  analyze the ultrasound images to measure an optic nerve sheath diameter (ONSD); and
  determine a likelihood of elevated intracranial pressure based on the measured ONSD;

a hinged lens mechanism that is configured to allow selective opening and closing for temporary vision access without removing the device from the user;

a wide-angle camera that is configured to provide real-time anatomical visualization to assist in transducer positioning; and a graphical user interface that is configured to display diagnostic information based on the determined likelihood of elevated intracranial pressure.

2. The wearable device of claim 1, comprising an audio speaker that is configured to provide instructions to the user based on the diagnostic information.

3. The wearable device of claim 1, wherein the wearable structure comprises at least one lens that is configured to be positioned to cover the eye of the user, and wherein the ultrasound transducer is integrated within the at least one lens and is configured to scan superior to inferior aspects and midline to lateral aspects of the eye.

4. The wearable device of claim 1, wherein the processor is configured to implement an artificial intelligence algorithm to dynamically adjust imaging parameters, including gain, depth, frequency, and focus, based on anatomical characteristics specific to the user.

5. The wearable device of claim 1, wherein the fluid management system comprises:
  a fluid reservoir containing water or ultrasound gel;
  a pump that transfers fluid from the fluid reservoir to a cavity that is configured to be formed between the ultrasound transducer and the eye of the user; and
  a fluid level sensor that is configured to monitor an amount of fluid in the cavity.

6. The wearable device of claim 1, wherein the processor is configured to use deep learning-based object keypoint similarity (OKS) to identify optimal diagnostic frames and measure the ONSD at a predefined depth behind the globe of the eye.

7. The wearable device of claim 1, comprising a power management module that is configured to selectively activate components of the wearable device based on operational requirements and a rechargeable power supply configured to support operation in remote environments.

8. The wearable device of claim 1, wherein the graphical user interface is configured to provide customizable diagnostic views, including trend graphs, confidence scores, and real-time alerts, and wherein the device is configured to operate in dual operational modes supporting continuous and intermittent monitoring.

9. A method for non-invasive monitoring of intracranial pressure (ICP), the method comprising:
  securing a wearable ultrasound device to a head of a user, the wearable ultrasound device comprising at least one ultrasound transducer positioned to align with an eye of the user;
  establishing an acoustic coupling medium between the ultrasound transducer and the eye of the user;
  employing a reinforcement learning-based control system to dynamically adjust a position and angulation of the ultrasound transducer to optimize image quality;
  filling a cavity between the transducer and the eye of the user with fluid while continuously monitoring fluid levels with a sensor;
  regulating pressure and airflow in the device to ensure stable imaging conditions;
  acquiring ultrasound images of an optic nerve sheath using the ultrasound transducer;
  analyzing the ultrasound images to measure an optic nerve sheath diameter (ONSD);
  determining a likelihood of elevated intracranial pressure based on the measured ONSD; and
  displaying diagnostic information based on the determined likelihood of elevated intracranial pressure.

10. The method of claim 9, comprising selecting optimal diagnostic frames from the acquired ultrasound images using a deep learning model trained to evaluate object keypoint similarity metrics.

11. The method of claim 9, comprising cross-validating ONSD measurements with other diagnostic metrics, including pulsatility indices, optic nerve sheath elasticity, and vascular flow parameters, for enhanced ICP assessment.

12. The method of claim 9, wherein analyzing the ultrasound images comprises measuring the ONSD at a predefined distance behind the globe of the eye using automated landmark detection.

13. The method of claim 9, comprising personalizing threshold values for ONSD measurements based on demographic factors specific to the user to improve diagnostic accuracy.

14. The method of claim 9, comprising operating the wearable ultrasound device in either continuous monitoring mode for real-time ICP tracking or intermittent monitoring mode for periodic assessment.

15. The method of claim 9, comprising:
  archiving acquisition parameters, diagnostic data, and metadata for integration with electronic health records; and
  wirelessly transmitting the diagnostic information to a remote monitoring system.

16. A non-transitory computer-readable medium storing computer-executable instructions that, when executed by a processor of a wearable ultrasound device, cause the processor to perform a method for non-invasive intracranial pressure (ICP) monitoring, the method comprising:
  controlling an ultrasound transducer positioned adjacent to an eye of a user to acquire ultrasound images of an optic nerve sheath;
  implementing a reinforcement learning algorithm to optimize transducer placement and ensure the optic nerve sheath is within an imaging field-of-view;
  analyzing the ultrasound images for quality control, including automatically filtering low-quality frames;

controlling a motorized control mechanism with six degrees of freedom to dynamically adjust a position of the ultrasound transducer based on image quality feedback;

measuring an optic nerve sheath diameter (ONSD) from selected ultrasound images;

determining a likelihood of elevated intracranial pressure based on the measured ONSD; and generating output data including a quality score, diagnostic measurements, confidence scores, and alerts.

17. The non-transitory computer-readable medium of claim 16, wherein implementing the reinforcement learning algorithm comprises filtering ultrasound images that fail to meet predetermined quality thresholds related to anatomical landmark visibility of the optic nerve sheath.

18. The non-transitory computer-readable medium of claim 16, wherein the method comprises tracking temporal changes in ONSD measurements over time to detect trends indicative of changing intracranial pressure.

19. The non-transitory computer-readable medium of claim 16, wherein the method comprises cross-validating ONSD measurements with supplementary diagnostic parameters including pulsatility indices and vascular flow metrics to enhance diagnostic reliability.

20. The non-transitory computer-readable medium of claim 16, wherein the method comprises automatically switching between continuous and intermittent monitoring modes based on detected changes in ONSD measurements that exceed predefined variability thresholds.

* * * * *